United States Patent
Ootake et al.

(10) Patent No.: US 6,664,839 B2
(45) Date of Patent: Dec. 16, 2003

(54) SEMICONDUCTOR INTEGRATED CIRCUIT HAVING REDUCED CROSSTALK INTERFERENCE ON CLOCK SIGNALS

(75) Inventors: Toshikazu Ootake, Kanagawa (JP); Osamu Fujimaki, Tokyo (JP)

(73) Assignee: NEC Electronics Corporation, Kawasaki (JP)

( * ) Notice: Subject to any disclaimer, the term of this patent is extended or adjusted under 35 U.S.C. 154(b) by 0 days.

(21) Appl. No.: 10/222,906

(22) Filed: Aug. 19, 2002

(65) Prior Publication Data

US 2003/0038664 A1 Feb. 27, 2003

(30) Foreign Application Priority Data

Aug. 21, 2001 (JP) ........................ 2001/250022

(51) Int. Cl.⁷ ................................................. G06F 1/04
(52) U.S. Cl. ........................................ 327/292; 327/295
(58) Field of Search ................................. 327/291–293, 327/295, 296, 261–263, 172, 175, 178

(56) References Cited

U.S. PATENT DOCUMENTS 5,977,810 A * 11/1999 Shirata ........................ 327/293
6,271,729 B2 * 8/2001 Sung et al. ................... 331/25
6,340,910 B1 * 1/2002 Saeki .......................... 327/296

* cited by examiner

*Primary Examiner*—My-Trang Nu Ton
(74) *Attorney, Agent, or Firm*—McGinn & Gibb, PLLC

(57) ABSTRACT

In a semiconductor integrated circuit having a first circuit which outputs n (n is an integer of 2 or more) clock signals $CK_i$ (i is an integer of 1 to n) each of which is delayed by a delay time of $i \times T$ (T is a constant time) from a reference signal, and a second circuit which carries out signal processing using n clock signals input from the first circuit via n signal wirings, for at least a part of the n signal wirings, the positions of the edges of two clock signals transmitted on the two adjacent signal wirings are separated, as seen on the time base, by more than T in the time.

20 Claims, 19 Drawing Sheets

NO CLOCK JUMP

3 CLOCK JUMP

SEMICONDUCTOR INTEGRATED CIRCUIT HAVING REDUCED CROSSTALK INTERFERENCE ON CLOCK SIGNALS

BACKGROUND OF THE INVENTION

1. Field of the Invention

The present invention relates to a semiconductor integrated circuit, and more particularly to a semiconductor integrated circuit which is readily capable of eliminating crosstalk noise which is generated on the reception side when sending clock signals in the same direction by using a plurality of wirings that are connecting the circuits.

2. Description of the Prior Art

The advancement of the processing speed of the computer or the like in recent years is remarkable, as exemplified by the operating speed of several hundreds MHz for the microprocessor of the personal computer, and a high rate data transfer in the band of several GHz is being obliged in the network market. Accompanying such a trend, the electrical signals that flow in the wirings (signal lines) that connect circuits within the IC become also high rate, making the effect of crosstalk between adjacent signals increasingly conspicuous.

Since the crosstalk gets the larger the smaller the distance between the wirings, it is a factor of obstruction standing in the way toward miniaturization and high density of the high speed circuit. In particular, when the width of data handled becomes large such as 32 bits or 64 bits, propagation of many signals in the same direction occurs more frequently, and the possibility of causing malfunctions of the system is increased due to superposition of noises of a plurality of noise sources.

FIG. 19 is a circuit diagram showing the internal configuration of a conventional semiconductor integrated circuit. FIG. 19 shows a circuit in which a plurality of clock signals CK1 to CK8 having identical delay difference between the signals, output from a delay locked loop (referred to as DLL hereinafter) circuit 101, are supplied to a data comparator (referred to as DCMP hereinafter) via an insert part 1402.

The DLL circuit 101 generates n (n is an integer of 2 or more, and it is 8 in this example) clock signals Cki (i is an integer of 1 to n) each of them being delayed by a delay time of i×T (T is a constant time) from a reference signal RCLK. In the buffer insert part 1402, there are provided buffers B1 to B8 corresponding to the clock signals CK1 to CK8. The buffers B1 to B8 are provided to prevent the attenuation of respective clock signals CK1 to Ck8 by the parasitic capacitances and the parasitic resistances of the wirings that connect the DLL circuit 101 to the DCMP circuit 103.

The clock signals CK1 to CK8 output from the DLL circuit 101 are input respectively to the input terminals of the buffers B1 to B8 via input wirings NI1 to NI8. The clock signals CK1 to CK8 output from the output terminals of the buffers B1 to B8 are input respectively to the corresponding input terminals of the DCMP circuit 103 via output wirings NO1 to NO8.

In FIG. 19, CI1, CI2, CI3, CI4, CI5, CI6 and CI7 represent the parasitic capacitances present between the input wirings NI1 and NI2, between NI2 and NI3, between NI3 and NI4, between NI4 and NI5, between NI5 and NI6, between NI6 and NI7 and between NI7 and NI8, respectively. Similarly, CO1, CO2, CO3, CO4, CO5, CO6 and CO7 represent the parasitic capacitances present between output wirings NO1 and NO2, between NO2 and NO3, between NO3 and NO4, between NO4 and NO5, between NO5 and NO6, between NO6 and NO7 and between NO7 and NO8, respectively.

FIG. 20 is a waveform diagram showing the clock signals CK1 and CK2, and the signals on the input wirings NI1 and NI2 connected to the input terminals of the buffers B1 and B2. The NI1 in FIG. 20 shows the clock signal flowing on the input wiring NI1, and the NI2 in FIG. 20 shows the clock signal CK2 flowing on the input wiring NI2.

The rise edge tr of the clock signal CK1 is propagated to the input terminal of the buffer B1 through the input wiring NI1. Owing to the parasitic capacitance CI1 and a wiring resistance, not shown, the tr edge of the clock signal CK1 arrives at the input terminal of the buffer B1 after a delay time of τ1. Moreover, the rise edge tr of the clock signal CK2 is propagated to the input terminal of the buffer B2 through the input wiring NI2. Owing to the parasitic capacitances CI1 and C2 and wiring resistances, not shown, the tr edge of the clock signal CK2 arrives at the input terminal of the buffer B2 with a delay time of τ2 after leaving the DLL circuit 101.

At this time, due to the fact that the input wiring NI1 of the buffer B1 and the input wiring NI2 of the buffer B2 are disposed adjacent in parallel, crosstalk noise caused by the tr edge of the clock signal CK1 mingles with the clock signal CK2 on the input wiring NI2 via the parasitic capacitance CI1.

As can be seen from FIG. 20, the edge tr of the clock signal CK2 flowing on the input wiring NI2 is located, as seen on the time base, in the vicinity of the edge tr of the clock signal CK1 flowing on the input wiring NI1.

Accordingly, low level of the clock signal CK2 flowing on the input wiring NI2 fluctuates as shown in FIG. 20 due to the effect of the crosstaslk, and a deviation corresponding to a minute time Δtr is generated in the tr edge of the clock signal CK2 on the input wiring NI2. In this manner, the crosstalk noise affects the tr edge of the clock signal CK2 flowing on the input wiring NI2.

Analogously, the crosstalk noise caused by the tr edge of the clock signal CK2 mingles with the clock signal CK1 flowing on the input wiring NI1 via the parasitic capacitance CI1. The crosstalk noise affects the tr edge of the clock signal CK1 flowing on the input wiring NI1, and generates a deviation of a minute time in the tr edge of the clock signal CK1.

Although the tr edge of rise alone has been mentioned in the above, similar situation occurs of course concerning the tf edge of the fall. For example, crosstalk noise caused by the tf edge of the clock signal CK1 mingles with the clock signal CK2 on the input wiring NI2 via the parasitic capacitance CI1. The crosstalk noise affects the tf edge of the clock signal CK2 flowing on the input wiring NI2, and generates a deviation corresponding to a minute time Δtf in the clock signal CK2.

As in the above, although no time difference exists between the tr edge and the tf edge of each of the adjacent clock signals CK1 to CK8 in the semiconductor integrated circuit in FIG. 19, deviations of minute time Δtr and Δtf are generated respectively in the tr edge and the tf edge of respective clock signals CK1 to CK8, owing to the effect of crosstalk noise generated by the interference between respective adjacent clock signals CK1 to CK8. This fact gives rise to a problem of increase in the skew (phase deviation) among the clock signals CK1 to CK8, and jitter (phase fluctuation) in each of the clock signals CK1 to CK8.

Generally, crosstalk noise attenuates in inverse proportion to the distance between the clock signals. Consequently, the solution to the problem will be obtained by simply taking the spacing between the signal lines large enough. However, taking the spacing between the signal lines large leads to an increase in the wiring area, and results in a large area of the IC which makes it fail to be a practical solution.

Next, by making correspondence to the circuit diagram in FIG. 19, a design method for determining the circuit layout and wiring of the semiconductor integrated circuit will be described in detail. FIG. 21 is a diagram showing a series of flows as will be described in the following. It starts with determination step 1602 of the layout positions of the DLL circuit 101 and the DCMP circuit 103, and after determination of the layout and wiring of the buffer insert part 1402, confirms the skews between the clock signals CK1 to CK8 and the jitters of the clock signals CK1 to CK8 in the buffer insert part 1402. After connecting among the DLL circuit 101 and the buffer insert part 1402 and the DCMP circuit 103, skews between the clock signals CK1 to CK8 output from the DLL circuit 101 and the jitters of the signals CK1 to CK8 are confirmed, the skews between the clock signals CK1 to CK8 and the jitters of the clock signals CK1 to CK8 input to the buffers B1 to B8 are confirmed, and the skews between the clock signals Ck1 to CK8 and the jitters of the clock signals CK1 to CK8 input to the DCMP circuit 103 are confirmed, to carry out a characteristic confirmation step 1610 for confirming whether or not the skews and the jitters in each of these steps satisfy the standards.

First, the engineer in charge of the design determines the layout positions of the DLL circuit 101 and the DCMP circuit 103 from the sizes and the order of the signal lines of the DLL circuit 101 and the DCMP circuit 103 (step 1602 in FIG. 21). Next, the designer makes rough estimate of parasitic capacitance per unit area of the wirings based on the layout positions of the DLL circuit 101 and the DCMP circuit 103 determined by step 1602, and determines required stage number of each of the buffers B1 to B8 of the buffer insert part 1402 by finding the drive capability per unit stage of the buffer insert part 1402 (step 1603).

Following that, the designer determines the size of the buffer insert part 1402 from the required stage number derived in step 1603 (step 1604), and carries out layout and wiring of each of the buffers B1 to B8 in the buffer insert part 1402 based on the determined size of the buffer insertion part 1402 (step 1605).

After completion of the wirings of the buffer insert part 1402, the designer executes a circuit simulation of the buffer insert part 1402 based on the layout of the buffer insert part 1402 and extracted circuit data on the parasitic capacitances and the parasitic resistances from the wiring result (step 1606). Then, the designer carries out characteristic confirmation whether or not the skews between the clock signals CK1 to CK8 and the jitters of the clock signals CK1 to CK8 satisfy the standards in the buffer insert part 1402 from the result of the circuit simulation in step 1606 (step 1607). When the result of the circuit simulation in step 1606 satisfies the standards, the designer wires between the DLL circuit 101 and the buffer insert part 1402, and between the buffer insert part 1402 and the DCMP circuit 103 as shown in FIG. 19 (step 1608). After completion of the wirings, the designer executes simulation of the entire circuit in FIG. 19 based on circuit data on the parasitic capacitances and the parasitic resistances extracted from the result of wirings of the buffer insert part 1402 and the DLL circuit 101 and the DCMP circuit 103 (step 1609).

The designer then carries out characteristic confirmation which checks whether or not the skews between the clock signals CK1 to CK8 and the jitters of the signals CK1 to CK8 satisfy the standards for the entire circuit in FIG. 19 from the result of the circuit simulation in step 1609 (step 1610). When the result of the circuit simulation in step 1610 satisfies the standards, the designer prepares art work data (referred to as GDS data hereinafter) (step 1611), and completes the design.

When the skews between the clock signals CK1 to CK8 and the jitters of the clock signals CK1 to CK8 do not satisfy the standards in step 1610, the designer decides whether or not it is possible to satisfy the standards by the wiring change between the DLL circuit 101 and the buffer insert part 1402, and the buffer insert part 1402 and the DCMP circuit 103 (steps 1613 and 1614). If it is decided to be possible, the designer changes the wirings between the DLL circuit 101 and the buffer insert part 1402, and the wirings between the buffer insert part 1402 and the DCMP circuit 103 (step 1615), and returns to step 1609.

When it is decided that the standards cannot be satisfied by the wiring changes in step 1614, or the skews between various clock signals CK1 to CK8 and the jitters of respective clock signals CK1 to CK8 are not satisfied in step 1607, the designer decides whether or not it is possible to satisfy the standards by changing the layout and the wirings of the buffer insert part 1402 (steps 1616 and 1617). When decided that it is possible, the designer changes the layout and the wirings of the buffer insert part 1402 (step 1618), and returns to step 1606.

When decided that it is not possible to satisfy the standards by the change in the layout and the wirings, the designer decides whether it is possible to satisfy the standards by a size change in the buffer insert part 1402 (steps 1619 and 1620). When decided that it is possible, the designer changes the size of the buffer insert part 1402 (step 1621), and returns to step 1605.

When decided that it is not possible to satisfy the standards by a size change in step 1620, the designer decides whether or not it is possible to satisfy the standards by a stage number change in the buffer insert part 1402 (steps 1622 and 1623). When decided that it is possible, the designer changes the stage number of the buffer insert part 1402 (step 1624), and returns to step 1604. When decided that it is not possible to satisfy the standards by a stage number change in step 1623, the designer changes the layout positions of the DLL circuit 101 and the DCMP circuit 103 (step 1625), and returns to step 1603.

As in the above, in the conventional design of a semiconductor integrated circuit, when the skews between the clock signals CK1 to CK8 and the jitters of the clock signals CK1 to CK8 do not satisfy the standards in the characteristic confirmation step 1607 of the buffer insert part 1402 or the characteristic confirmation step 1610 of the overall circuit, it has been necessary to carry out a wiring change between the DLL circuit 101 and the buffer insert part 1402, and between the buffer insert part 1402 and the DCMP circuit 103 (step 1615), the layout change and the wiring change of the buffer insert part 1402 (step 1618), the size change of the buffer insert part 1402 (step 1621), the stage number change in the buffer insert part 1402 (step 1624), and the layout position change of the DLL circuit 101 and the DCMP circuit 103 (step 1625).

As described in the above, in the conventional semiconductor integrated circuit, there is a problem that the skews between the clock signals CK1 to CK8 and the jitters of respective clock signals CK1 to CK8 are increased due to the crosstalk noise among a plurality of clock signals CK1 to CK8. Generally speaking, the effect of crosstalk noise can be reduced by giving shield wirings between the wirings of respective clock signals CK1 to CK8, or by increasing the separation between the clock signals CK1 to CK8. However, in the former technique it becomes necessary to give additional wiring and spacing between the clock signal wirings as a result of insertion of the shield, and in the latter technique the space between the clock signal wirings is similarly increased, so that it leads to a drawback in that the area of the IC is enlarged.

In a structure in which shield wirings are provided between clock signals CK1 to CK8, it is necessary to have the spacing between the signal wirings somewhat larger than the spacing of design reference for the semiconductor integrated circuit. For this reason, in the example shown in FIG. 19, for example, when shield wirings are provided between the clock signals CK1 to Ck8, the area of wirings becomes about 2.5 times as large as that of the case without the shield wirings. As a result, the wiring capacitance per unit length for each of the clock signals CK1 to CK8 is also increased, the stage number of insertion of the buffers B1 to B8 for avoiding attenuation due to parasitic capacitances and parasitic resistances is increased, the overall area of the semiconductor integrated circuit becomes close to three times as large, and a vicious cycle is generated in which the effect of manufacturing variation between the buffers B1 to B8 generated in the processes of manufacture is added to the skews between the clock signals CK1 to CK8 and the jitters in respective clock signals CK1 to CK8. Because of this, it leads to a problem in that the standards are not satisfied in high speed design and the yield is reduced. Meanwhile, in a structure in which the spacing between the clock signal wirings are expanded, the spacing between the wirings that relaxes the effect of crosstalk noise generally requires more than several [$\mu$m], and results in the total area of the semiconductor integrated circuit reaching to more than five times as large according to the design reference in the sub-micron era, which is impractical.

Furthermore, in the conventional semiconductor integrated circuits, it is necessary in design to go back to a preceding step for redesigning, which gives rise to a problem of long design time because of a large number of return steps.

BRIEF SUMMARY OF THE INVENTION

Object of the Invention

It is the object of the present invention to provide a semiconductor integrated circuit which can reduce the skews between the clock signals and the jitters of respective clock signals without increasing the area of the semiconductor integrated circuit.

Summary of the Invention

In a semiconductor integrated circuit having a first circuit which outputs n (n is an integer of 2 or more) clock signals CKi (i is an integer of 1 to n) each of which is delayed by a delay time of i×T (T is a constant time) from a reference signal, and a second circuit which carries out signal processing using the n clock signals input from the first circuit via n signal wirings, when edge positions of two clock signals transmitted on two adjacent signal wirings, as seen on the time base, are separated in time by a time larger than T, at least for a part of the n signal wirings.

BRIEF DESCRIPTION OF THE DRAWINGS

The above-mentioned and other objects, features and advantages of this invention will become more apparent by reference to the following detailed description of the invention taken in conjunction with the accompanying drawings, wherein.

DETAILED DESCRIPTION OF THE INVENTION

Figure 1:
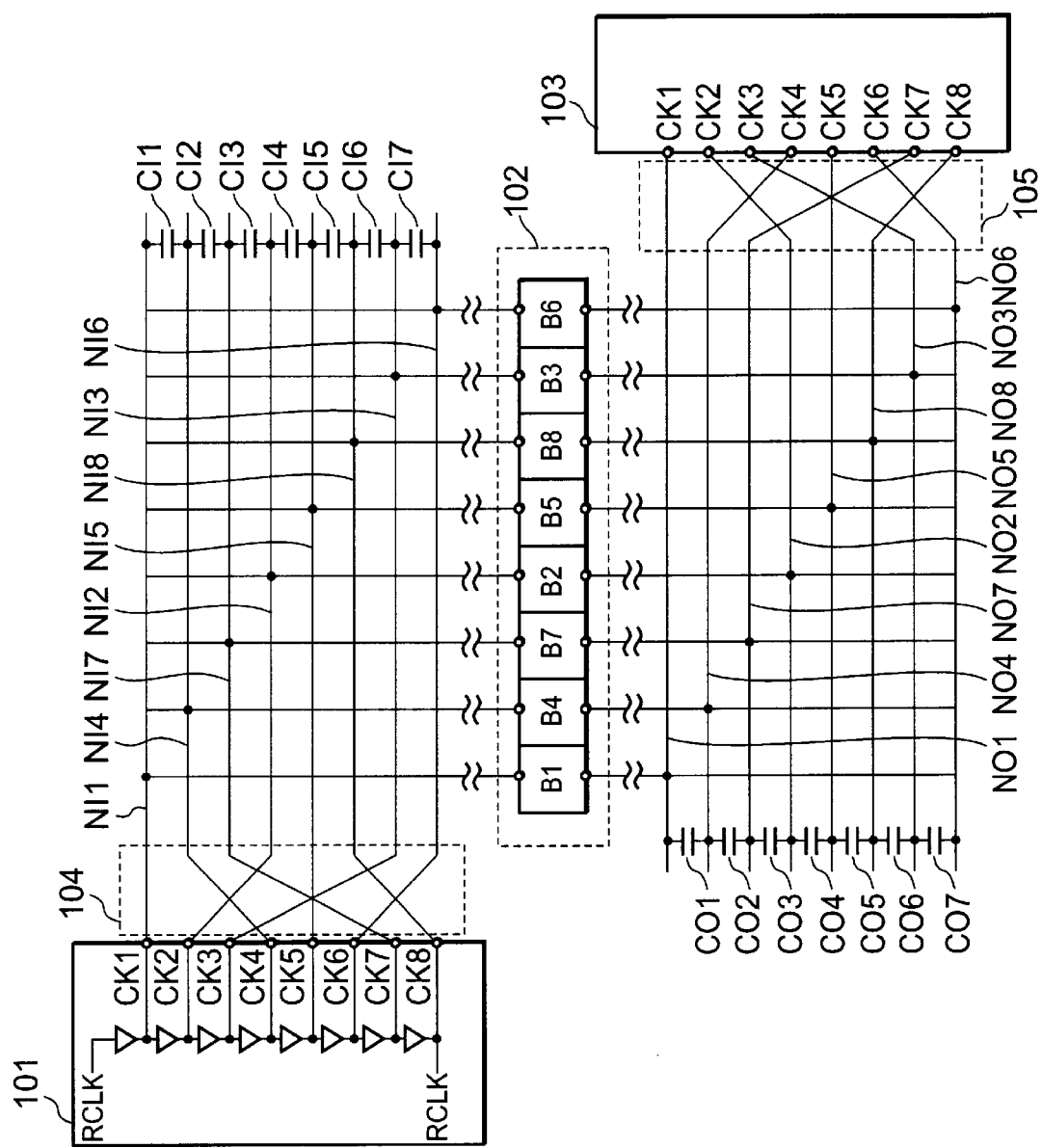
FIG. 1 is a circuit diagram showing the internal configuration of the semiconductor integrated circuit of a first example of the present invention.

Referring to the drawings, the embodiments of the present invention will be described in detail. FIG. 1 is a circuit diagram showing the internal configuration of the semiconductor integrated circuit that serves as a first example of the invention. FIG. 1 shows a circuit which supplies a plurality of clock signals CK1 to CK8 having identical delay difference that are output from the DLL circuit 101 to the DCMP circuit 103 via the buffer insert part 102.

Figure 2:
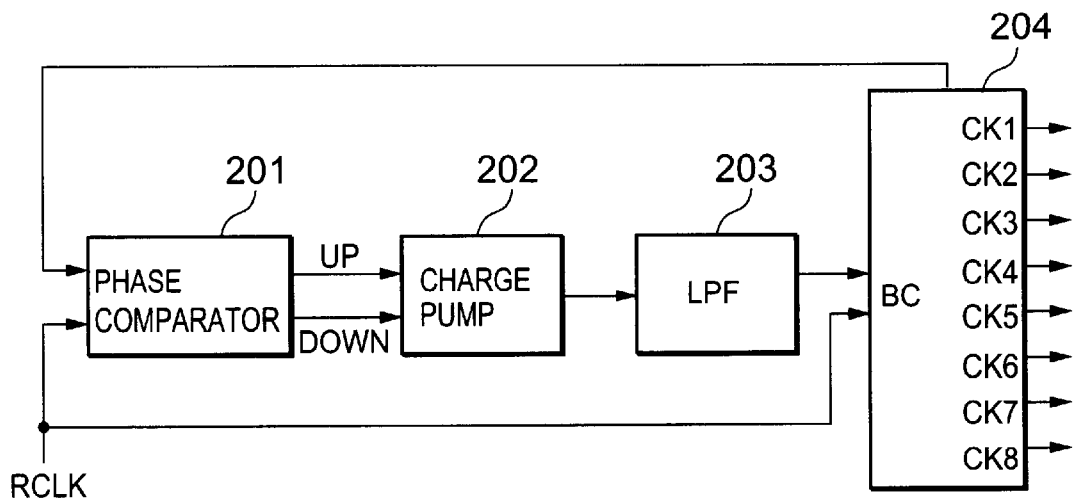
FIG. 2 is a block diagram showing the configuration of the DLL circuit in the first example of the invention.

Here, the configuration and the operation of the DLL circuit 101 will be described briefly. In FIG. 2 which shows the configuration of the DLL circuit 101, the circuit 101 comprises a phase comparator 201, a charge pump 202, a low pass filter (referred to as LPF hereinafter) 203 and a delay time variable buffer chain (referred to as BC hereinafter) 204.

The phase comparator 201 compares the phases of the output signal from the BC 204 and of a reference signal RCLK, and outputs a phase difference up signal or a phase difference down signal corresponding to the difference between the two. The charge pump 202 supplies a charging or discharging signal to the LPF 203 corresponding to the phase difference up signal or the phase difference down signal. The LPF 203 removes unwanted component or noise contained in the output of the charge pump 202 and supplies the result to the BC 204.

The charge pump 202 and the LPF 203 function as a loop filter which changes the voltage to be given to the BC 204 in response to the phase difference up signal or the phase difference down signal. The BC 204 changes the delay time relative to the RCLK in the direction to cancel the phase difference in response to the output voltage of the loop filter.

Figure 3:
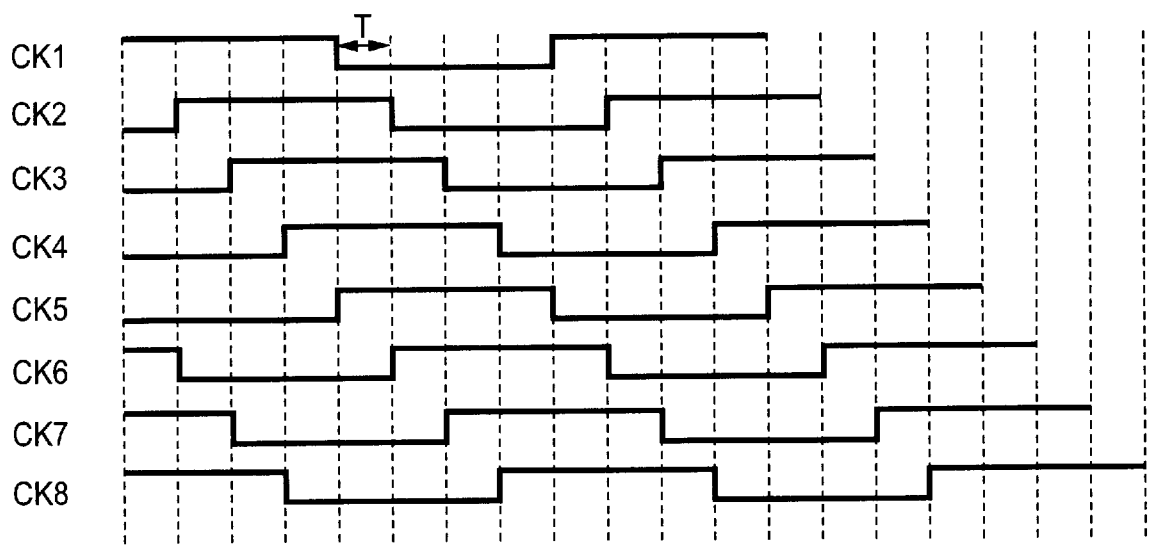
FIG. 3 is a waveform diagram showing the timings of clock signals output from the DLL circuit in the first example of the invention.

In this manner, the DLL circuit 101 generates n (n is an integer of 2 or more, which is 8 here) clock signals CKi (i is an integer of 1 to) each of which has a delay time of i×T (T is a constant time) from the reference signal RCLK. The relation among the clock signals CK1 to CK8 output from the DLL circuit 101 are shown in FIG. 3.

The order of the input wirings NI1 to NI8 which transmit the clock signals CK1 to CK8 from the DLL circuit 101 to the buffer insert part 102 are changed by a first wiring permute part 104 and are connected to the input terminals of the corresponding buffers B1 to B8 in the buffer insert part 102.

The buffers B1 to B8 in the buffer insert part 102 are provided to prevent attenuation of respective clock signals CK1 to CK8 due to the parasitic capacitances and the parasitic resistances of the wirings connecting the DLL circuit 101 and the DCMP circuit 103. The order of the output wirings NO1 to NO8 that transmit the clock signals CK1 to CK8 from the output terminals of the buffers B1 to B8 to the DCMP circuit 103, are changed by a second wiring permute part 105 and are connected to the corresponding input terminals of the DCMP circuit 103.

Symbols CI1, CI2, CI3, CI4, CI5, CI6 and CI7 represent parasitic capacitances present between the input wirings NI1 and NI4, between NI4 and NI7, between NI7 and NI2, between NI2 and NI5, between NI5 and NI8, between NI8 and NI3 and NI3 and NI6, respectively. Moreover, CO1, CO2, CO3, CO4, CO5, CO6 and CO7 represent parasitic capacitances present between the output wirings NO1 and NO4, between NO4 and NO7, between NO7 and NO2, between NO2 and NO5, between NO5 and NO8, between NO8 and NO3 and between NO3 and NO6, respectively.

Next, describing the operation of the DCMP circuit 103 briefly, this is a circuit which employs respective clock signals CK1 to CK8 as dummy high speed clocks by utilizing a plurality of rise edges tr or fall edges tf of the clock signals CK1 to CK8 having identical delay difference that are output from the DLL circuit 101, and converts high speed serial data into several strings of low speed parallel data.

Figure 4:
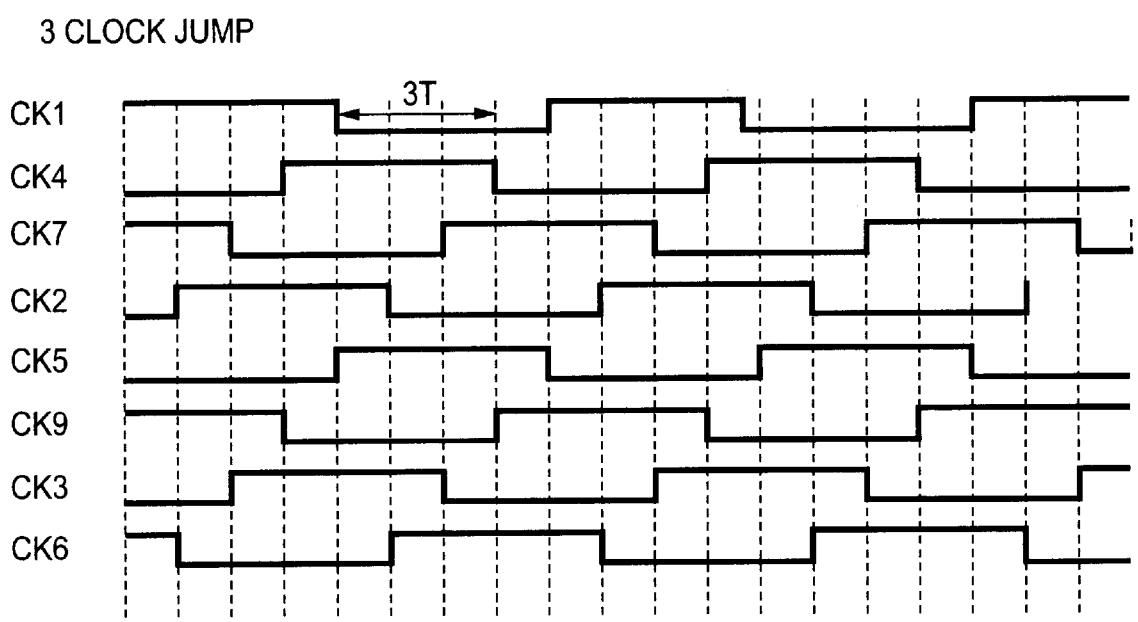
FIG. 4 is a waveform diagram showing the timings of the clock signals from the output of a first wiring permute part to the input of a second wiring permute part.

Here, by setting the number of clock signals n equal to 8, so that the clock signals CKi (i is an integer of 1 to n) is delayed by a delay time i×T (T is a constant time) from the reference signal RCLK, the clock signals CK1 to CK8 in this example are arranged such that the positions on the time base of the fall edges tf of this example are shifted sequentially by 3T as shown in FIG. 4.

In other words, in this example, during the period from the output at the first wiring permute part 104 to the input to the second wiring permute part 105, the buffers B1, to B8 are one-dimensionally arranged in the order of B1, B4, B7, B2, B5, B8, B3, and B6 so as to have the clock signals CK1 to CK8 arrayed in the order CK1, CK4, CK7, CK2, CK5, CK8, CK3 and Ck6.

Furthermore, in response to the layout structure, the order of the input wirings NI1 to NI8 are permuted by the first wiring permute part 104 so as to be arranged in the order of NI1 (NO1), NI4 (NO4), NI7 (NO7), NI2 (NO2), NI5 (NO5), NI8 (NO8), NI3 (NO3) and NI6 (NO6).

Figure 5:
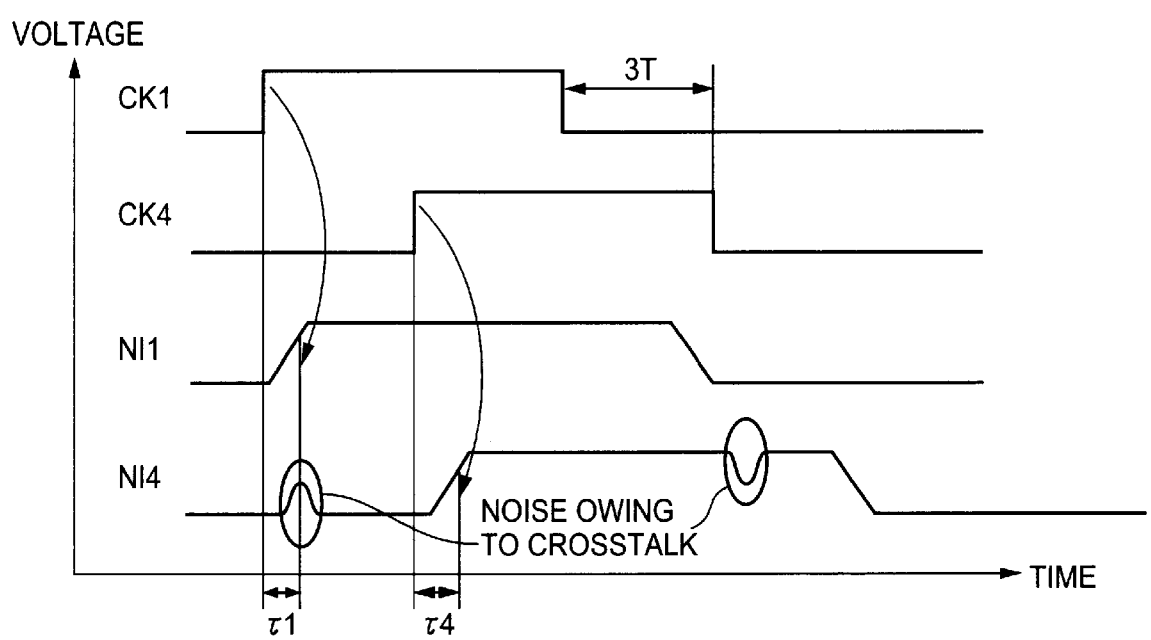
FIG. 5 is a waveform diagram showing the clock signals output from the DLL circuit and signals on input wirings connected to the input terminals of the buffers in the first example of the invention.
Figure 6:
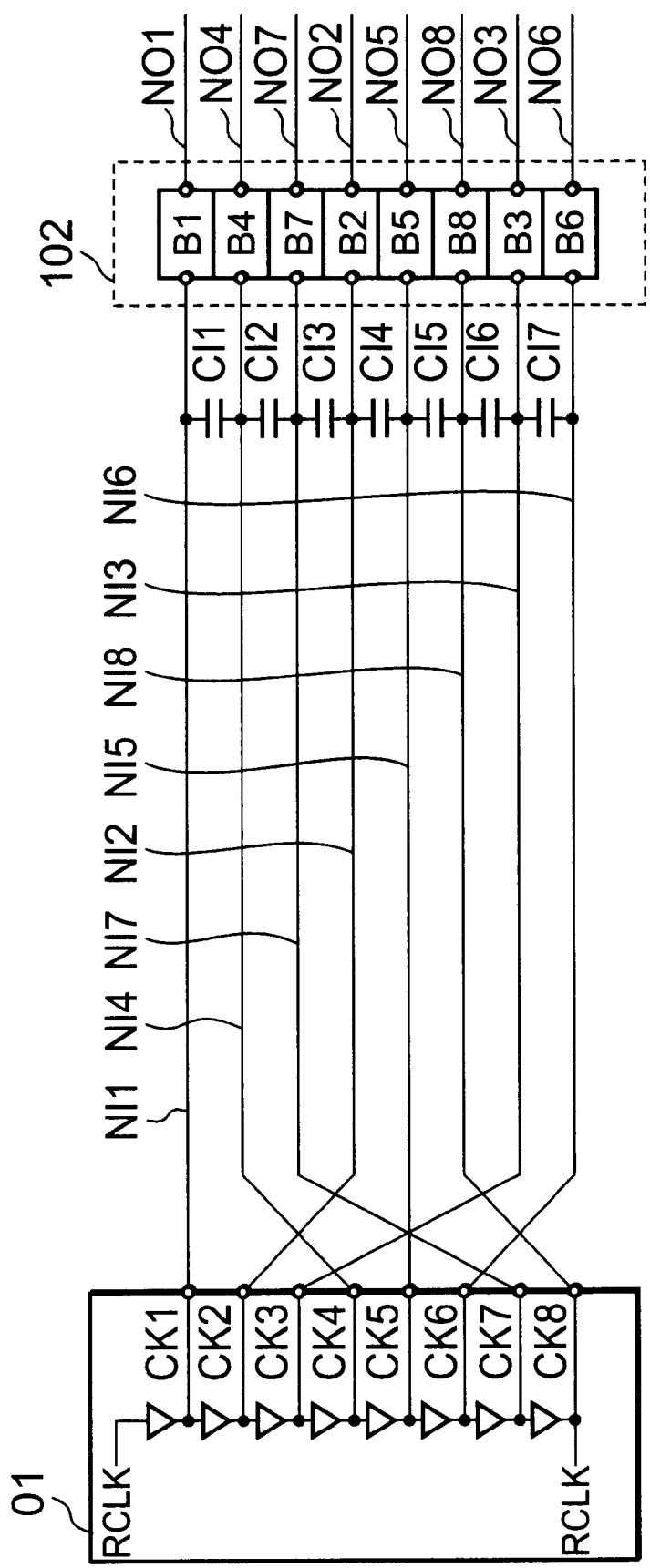
FIG. 6 is a magnified circuit diagram showing the configuration from the DLL circuit to the buffer group of the buffer insert part in the first example of the invention.

FIG. 5 is a waveform diagram showing the clock signals CK1 and CK4 output from the DLL circuit 101, and the signals on the input wirings NI1 and NI4 connected to the input terminals of the buffers B1 and B4. NI1 and NI4 in FIG. 5 show the clock signals CK1 and CK4, that flow on the input wirings NI1 and NI4, respectively. FIG. 6 is an enlarged circuit diagram showing the configuration from the DLL circuit 101 to the buffer group B1 to B8 of the buffer insert part 102.

The rise edge tr of the clock signal CK1 is propagated to the input terminal of the buffer BI through the input wiring NI1. The tr edge of the clock signal CK1 arrives at the input terminal of the buffer B1 after a delay time of τ1 following the output from the DLL circuit 101 owing to the parasitic capacitance CI1 and a wiring resistance not shown. Similarly, the rise edge tr of the clock signal CK2 is propagated to the input terminal of the buffer B1 through the input wiring NI2. The tr edge of the clock signal CK2 arrives at the input terminal of the buffer B2 after a delay time of τ2 following the output from the DLL circuit 102 owing to the parasitic capacitances CI3 and CI4 and wiring resistances not shown.

Moreover, the rise edge tr of the clock signal CK4 is propagated to the input terminal of the buffer B4 through the input wiring NI4. The tr edge of the clock signal CK4 arrives at the input terminal of the buffer B4 after a delay time of τ4 following the output from the DLL circuit 101 owing to the parasitic capacitances CI1 and CI2 and wiring resistances not shown.

In this case, since the input wiring NI1 of the buffer B1 and the input wiring NI4 of the buffer B4 are disposed parallel adjacently, crosstalk noise caused by the tr edge of the clock signal CK 1 mingles with the clock signal CK4 on the input wiring NI4 via the parasitic capacitance CI1.

However, as can be seen also from FIG. 5, the tr edge of the clock signal CK4 flowing on the input wiring NI4 is delayed largely from the tr edge of the clock signal flowing on the input wiring NI1, with a sufficient time difference between them, crosstalk noise caused by the tr edge of the clock signal CK1 will not affect the tr edge of the clock signal CK4 flowing on the input wiring NI4.

Analogously, since the input wiring NI2 of the buffer B2 and the input wirings NI5 and NI7 of the buffers B5 and B7 are disposed in parallel adjacently, crosstalk noise caused by the tr edge of the clock signal CK2 flowing on the input wiring NI2 mingles with clock signals CK5 and CK7 on the input wirings NI5 and NI7 via the parasitic capacitances CI3 and CI4.

However, the tr edges of the clock signals CK5 and CK7 flowing on the input wirings NI5 and NI7 are delayed largely with respect to the tr edge of the clock signal CK2 flowing on the input wiring NI2, with a sufficient time difference between the two, so that the crosstalk noise caused by the tr edge of the clock signal CK2 will not affect the clock signals CK5 and CK7 flowing on the input wirings NI5 and NI7.

By arranging the positions of the tr edges of adjacently situated clock signals to have a sufficient time difference as in the above, it is possible to eliminate the effect of the crosstalk owing to interference between the clock signals CK1 to CK8 as well as to reduce the skews between respective clock signals CK1 to CK8 and the jitters of respective clock signals CK1 to CK8. Needless to say, similar effect can also be obtained for the fall edges tf, although description is given only about the rise edges tr in the above.

Figure 19:
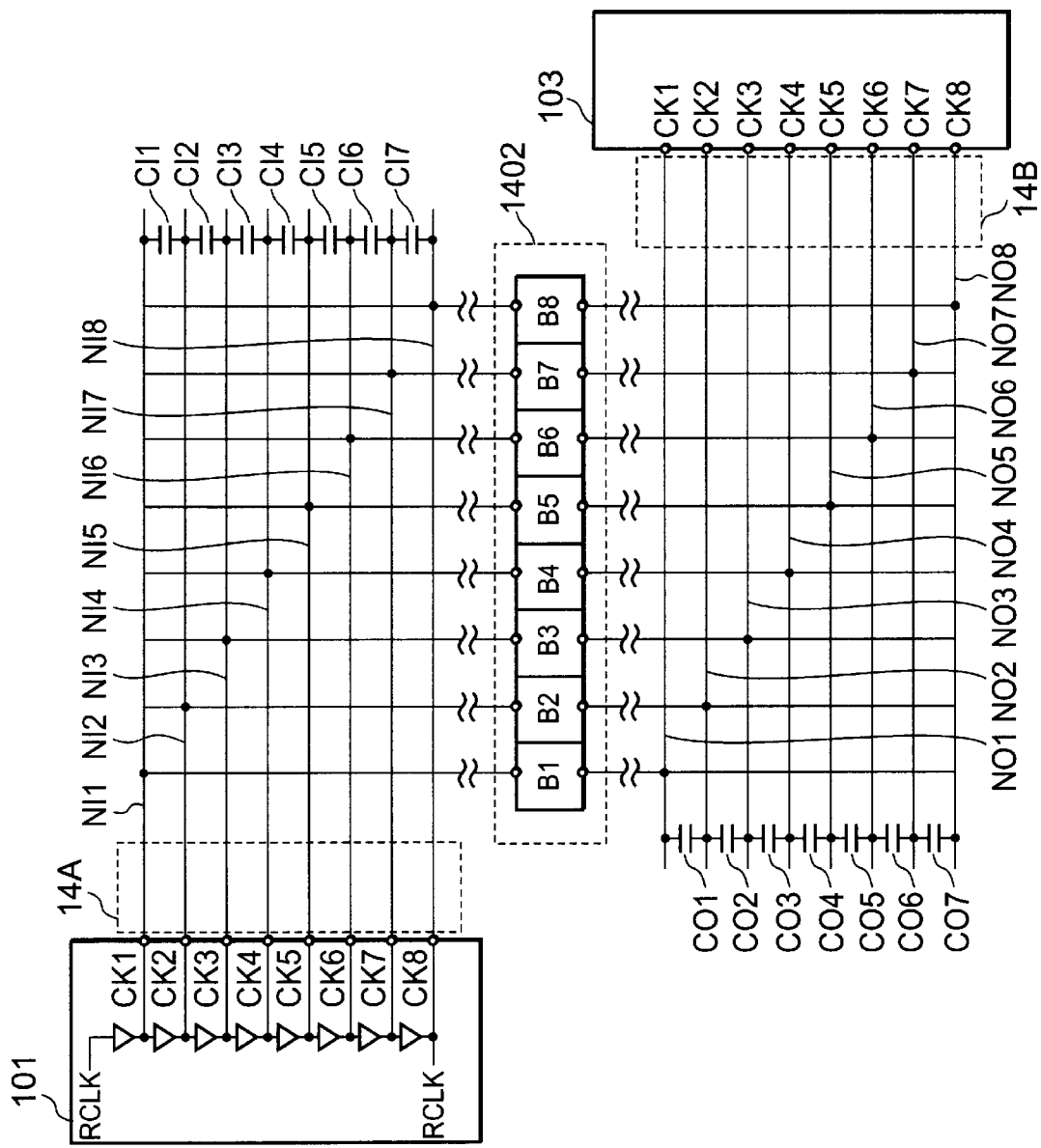
FIG. 19 is a circuit diagram showing the internal configuration of the conventional semiconductor integrated circuit.

For example, consider the case in which a reference clock RCLK of 311 [MHz] is applied to the DLL circuit 101 shown in FIG. 1, clock signals CK1 to CK8 having a delay difference time T of 200 [ps] each are taken out from the output terminals of the DLL circuit 101, a constitution of about 16 stages is given to the buffer insert part 102 to send the clock signals CK1 to CK8 to the DCMP circuit 103. A comparison of the circuit simulation results between the prior art shown in FIG. 19 and this example revealed that as to the skew, the effect of delay variation due to the crosstalk is uniformized for each clock signal, with a reduction from 500 [ps] of the prior art to about 50 [ps] in this example. As for the jitter, the value of about 200 [ps] for the prior art is reduced to about 1 [ps] in this example because the effect of delay variation due to crosstalk operates in the region outside the tr or tf edge.

Figure 7:
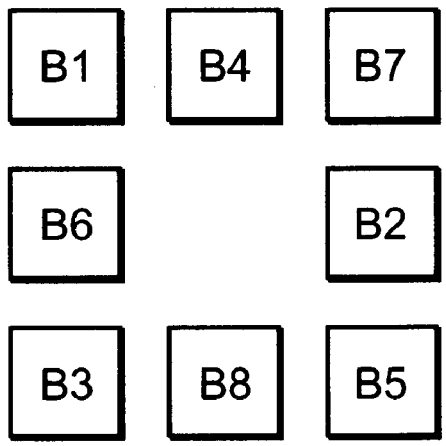
FIG. 7 is a plan view showing the arrangement structure of the buffer insert part in a second example of the invention.

Next, referring to the drawings, a second example will be described in detail. FIG. 7 is a plan view showing the layout structure of the buffer insert part 102 of this example. The example shows another example of the layout structure of the buffer insert part 102. In contrast to the first example in which the buffers B1 to B8 of the buffer insert part 102 are arranged one-dimensionally as shown in FIG. 6, the buffers B1 to B8 of this example are arranged clockwise in the order of B1, B4, B7, B2, B5, B8, B3, and B6 as shown in FIG. 7.

Focusing the attention on the rise edges tr or the fall edges tf of the clock signals CK1 and CK7 input to the buffers B1 and B7 adjacently arranged to the buffer B4, the tr edges or tf edges of the clock signals CK1 and CK7 are advanced or lagged by 3T relative to the tr edge or the tf edge of the clock signal CK4. Accordingly, the crosstalk noise caused by the tr edge or the tf edge of the clock signal CK4 will not affect the tr edge or the tf edge of the clock signals CK1 and CK7, and conversely, the crosstalk noise caused by the tr edge or the tf edge of the clock signals CK1 and CK7 will not affect the tr edge or the tf edge of the clock signal CK4.

Analogously, focusing the attention on the rise edge tr or the fall edge tf of the clock signals CK4 and CK2 input to the buffers B4 and B2 that are arranged adjacently to the buffer B7, the tr or tf edge of the clock signals CK4 and CK2 is advanced or lagged by 3T with respect to the tr or tf edge of the clock signal CK7, so that the crosstalk caused by the tr or tf edge of the clock signal CK7 will not affect the tr or tf edge of the clock signals CK4 and CK2, and conversely, the crosstalk caused by the tr or tf edge of the clock signals CK4 and CK2 will not affect the tr or tf edger of the clock signal CK7.

Consequently, according to this invention, propagation of the radio waves is performed precisely with reduction in the skews between the clock signals CK1 to CK8 and in the jitters of respective clock signals CK1 to CK8.

Figure 8:
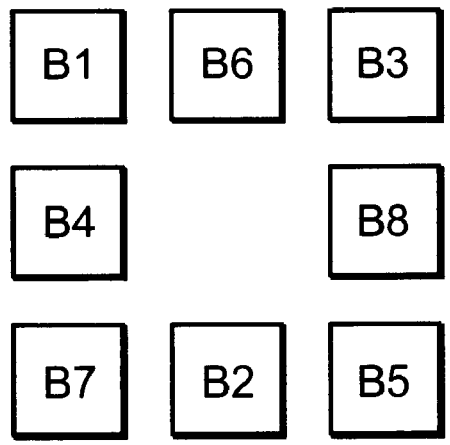
FIG. 8 is a plan view showing the arrangement structure of the buffer insert part in a third example of the invention.

Next, referring to the drawings, a third example of the invention will be described in detail. FIG. 8 is a plan view of the layout structure of the buffer insert part 102 according to this example. Although the layout of the clock signals CK1 to CK8 is the same as in the second example as indicated in FIG. 4, the buffers B1 to B8 in this example are arranged counterclockwise in the order of B1, B4, B7, B2, B5, B8, B3 and B6 as shown in FIG. 8.

Incidentally, when the time difference of two clock signals input to two adjacent buffers is set at 2T, and the buffers B1 to B8 are arranged clockwise in the order of B1, B3, B5, B7, B2, B4, B6 and B8, there is generated a timing in which the positions on the time base of the tr or tf edge of the clock signal CK1 input to the buffer B1 and the tr or tf edge of the clock signal CK8 input to the buffer B8 appear close to each other, in which the tr or tf edge of the clock siignal CK1 may affect the tr or tf edge of the clock signal CK8, and vice versa. As a result, it may be concluded, when the number of clock signals is eight, that the orders as indicated in the second and the third examples are the optimum.

Figure 9:
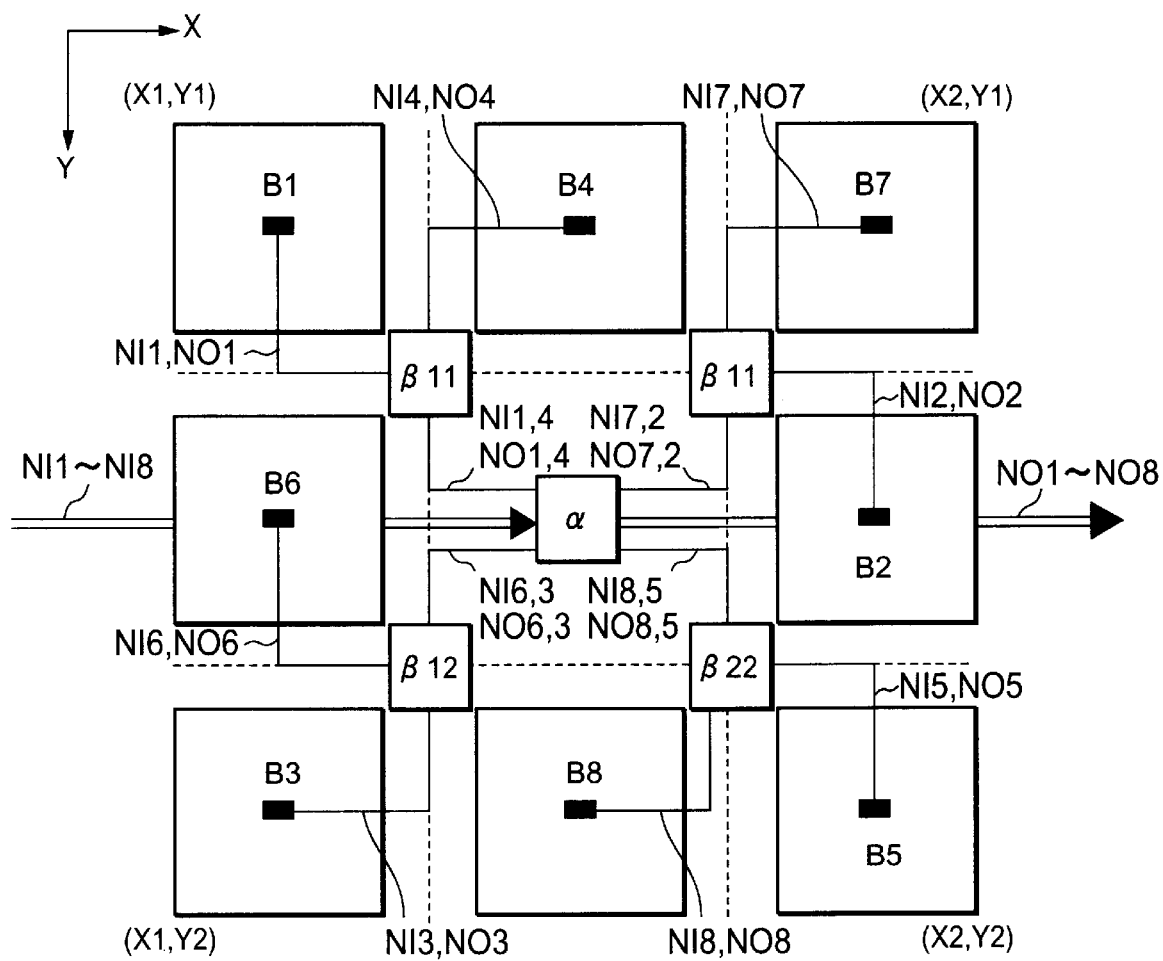
FIG. 9 is a plan view showing the arrangement structure of the buffer insert part in a fourth example of the invention.

Referring to the drawings, a fourth example of the invention will be described in detail next. FIG. 9 is a plan view showing the wiring structure of this case, which is another example of the buffer insert part 102. In this example, the DLL circuit 101, the first wiring switch part 104, the input wirings NI1 to NI8, the output wirings NO1 to NO8, the second wiring switch part 105 and the DCMP circuit 103 are also the same as in the first example.

In this example, the buffers B1 to B8 are arranged in such an order as shown in FIG. 7 that the positions on the time base of the fall edge s tf of the clock signals CK1 to CK8 are shifted by 3T sequentially. Besides, the input wirings NI1 to NI8 to the buffers B1 to B8 are bundled at a point α in the central part of the region where the buffers B1 to B8 are arranged.

Next, the input wirings NI1 to NI8 collected at the point a are distributed to four points β11, β12, β21 and β22 so as to give equal wiring length from the point α. In this case, the input wirings NI1 and NI4 to the buffers B1 and B4 are wired from the point α to the point β11, the input wirings NI7 and NI2 to the buffers B7 and B2 are wired to the point β21, the input wirings NI5 and NI8 to the buffers B5 and B8 are wired to the point β22 and the input wirings NI3 and NI6 to the buffers B3 and B6 are wired to the point β12.

Following that, the input wirings NI1 to NI8 wired to the points β11, β12, β21 and β22 are split into two parts at each of these points so as to have the equal wiring length from each of the points β11, β12, β21 and β22 to the input terminals of the connection destinations of the buffers B! to B8.

That is to say, the input wirings NI1 and NI4 wired up to the point β11 are extended to the input terminals of the buffers B1 and B4, respectively, the input wirings NI7 and NI2 wired to the point β21 are wired respectively to the input terminals of the buffers B7 and B2, the input wirings NI5 and NI8 wired to the point β22 are wired respectively to the input terminals of the buffers B5 and B8, and the input wirings NI3 and NI6 wired to the point β12 are wired respectively to the input terminals of the buffers B3 and B6.

In the meantime, for the output terminals NO1 to NO8, it need only to wire along the reverse routes to the input wirings NI1 to NI8. First, the output wirings NO1 to NO8 are wired to the points β11, β12, β21 and β22 so as to have equal wiring lengths to the buffers B1 to B8.

In other words, the output wirings NO1 and NO4 are wired from the output terminals of the buffers B1 and B4 to the point β11, the output wirings NO7 and NO2 are wired from the output terminals of the buffers B7 and B2 to the point β21, the output wirings NO5 and NO8 are wired from the output terminals of the buffers B5 and B8 to the point β22 and the output wirings NO3 and NO6 are wired from the output terminals of the buffers B3 and B6 to the point β12.

Then, the output wirings NO1 to NO8 wired to the points β11, β12, β21 and β22 are extended to the point a so as to have the equal wiring lengths.

When the number n of the clock signals is eight, the coordinates Xα and Yα of the point α are derived from the following expressions.

$$X\alpha=(X2-X1)/2+X1,$$
$$Y\alpha=(Y2-Y1)/2+Y1 \quad (1)$$

In Eq. (1), X2 and X1 are the maximum and minimum values in the X direction, respectively, of the region where the buffer group B1 to B8 is arranged, and Y2 and Y1 are the maximum and minimum values in the Y direction of the same region.

In addition, the coordinates Xjk and Yjk of the points βjk (j and k are natural numbers, and j, k=1,2 here) are derived from the following expressions.

$$Xjk=j\times(X2\square X1)/3+X1,$$
$$Yjk=k\times(Y2\square Y1)/3+Y1 \quad (2)$$

Figure 10:
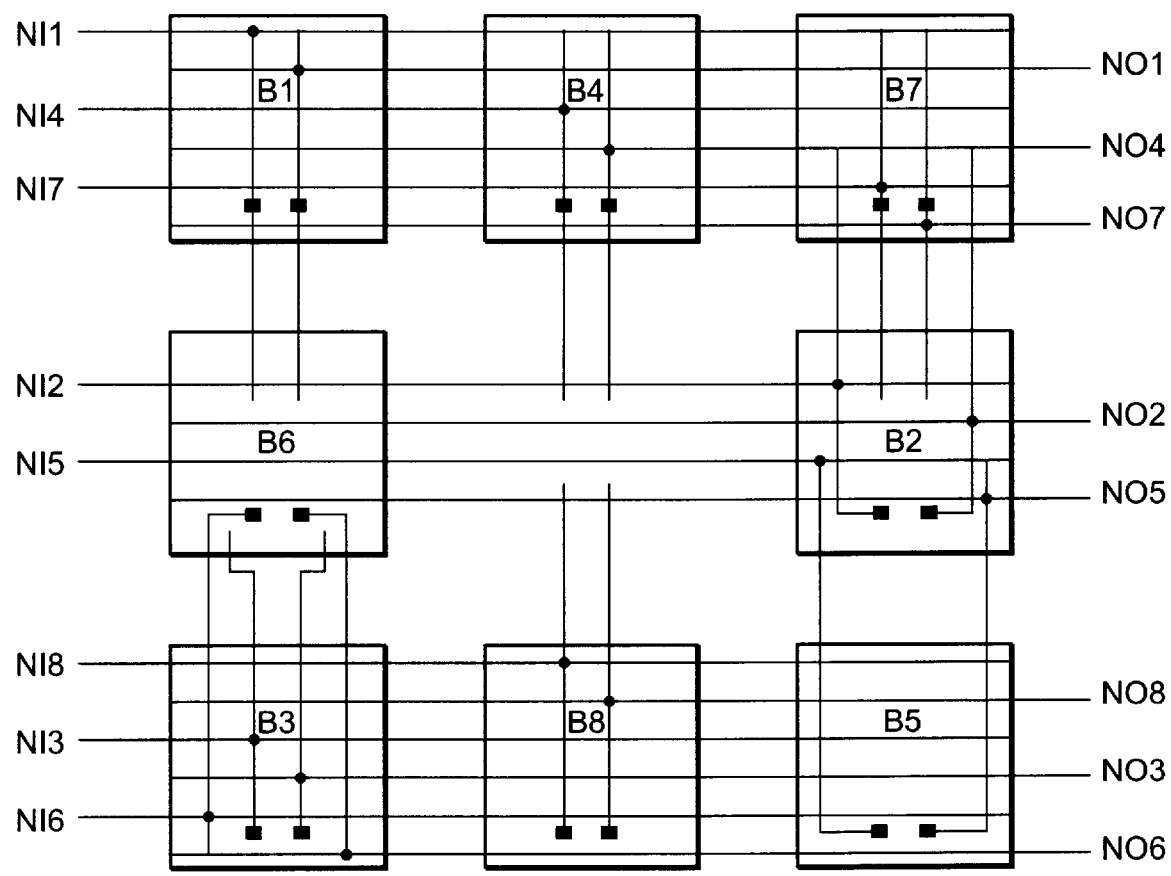
FIG. 10 is a plan view showing the arrangement structure of the buffer insert part in a fifth example of the invention.

Referring to the drawings, a fifth example will be described in detail. FIG. 10 is a plan view showing the wiring structure of the buffer insert part 102 according to this reference example. In this example, the constitution is also the same as that of the first example except for the structure of the buffer insert part 102.

In this example, the buffers B1 to B8 are arranged in the order as shown in FIG. 7 so as to have the positions on the time base of the fall edges tf of the clock signals CK1 to CK8 are shifted sequentially by 3T, and connected clock signals CK1 to CK8 with bus bars.

First, the input wirings NI1 to NI8 are arranged to the right end of the region in which the group of the buffers B1 to B8 are arrayed so as to have the lengths of the input wirings NI1 to NI8 are equal. In this case, the input wirings are arrayed in the order NI1, NI4, NI7, NI2, Ni5, NI8, NI3 and NI6. Then, the input wirings NI1 to NI8 in the Y direction to be connected to the input wirings NI1 to NI8 in the X direction are wired to the input terminals of the buffers B1 to B8 so as to have an equal length.

For the output wirings NO1 to NO8, it only need to be wired in the reverse direction to the input wirings NI1 to NI8. Namely, when the output wirings NO1 to NO8 are to be taken out from the output terminals of the buffers B1 to B8, the lengths in the Y direction of the output wirings NO1 to NO8 are equal with each other.

Next, the output wirings NO1 to NO8 are arranged with the left end of the region where the buffers B1 to B8 are arrayed as the starting point, i8n order to have the same length for the output wirings NO1 to NO8 in the X direction to be connected to the output wirings NO1 to NO8 in the Y direction. At this time, the arrangement of THE] output wirings is in the order of NO1, NO4, NO7, NO2, NO5, NO8, NO3 and NO6.

As in the above, according to this example, it is possible to make the wiring lengths and the wiring capacitances of the input wirings to the buffers B1 to B8, and the wiring lengths and the wiring capacitances of the output wirings from the buffers B1 to B8. As is clear from the description in the above, the noise caused by the crosstalk will not affect the adjacent wirings, and the skews between the clock signals and the jitters of respective clock signals can be eliminated.

It should be noted that when the number of clock signals is eight, if the clock signals CK1 to CK8 are arranged such that the fall edges tf of the clock signals CK1 to CK8 are shifted on the time base sequentially by 3T or 5T, the rise edges tr are mutually separated sufficiently wide, there arise spots where the fall edge tf and the rise edge tr are adjacent with a delay of only one clock. Because of this, there may be a case in which the reduction effect of the skew and jitter is insufficient.

Note, however, that the buffers B1 to B8 of the buffer insert part 102 comprise a CMOS inverter where the tr edge and the tf edge of the CMOS inverter are determined by the drive capability of a P-channel MOS (referred to as PMOS hereinafter) and an N-channel MOS (referred to as NMOS hereinafter), respectively.

Thus, when a PMOS and an NMOS with an identical gate width is compared, the NMOS has a higher drive capability than the PMOS, and when the widths of crosstalk noise due to tr and tf edges are compared, the width of the tf edge is smaller than that of the tr edge, so that the crosstalk noise due to the tf edge does not affect the tr edge.

Figure 20:
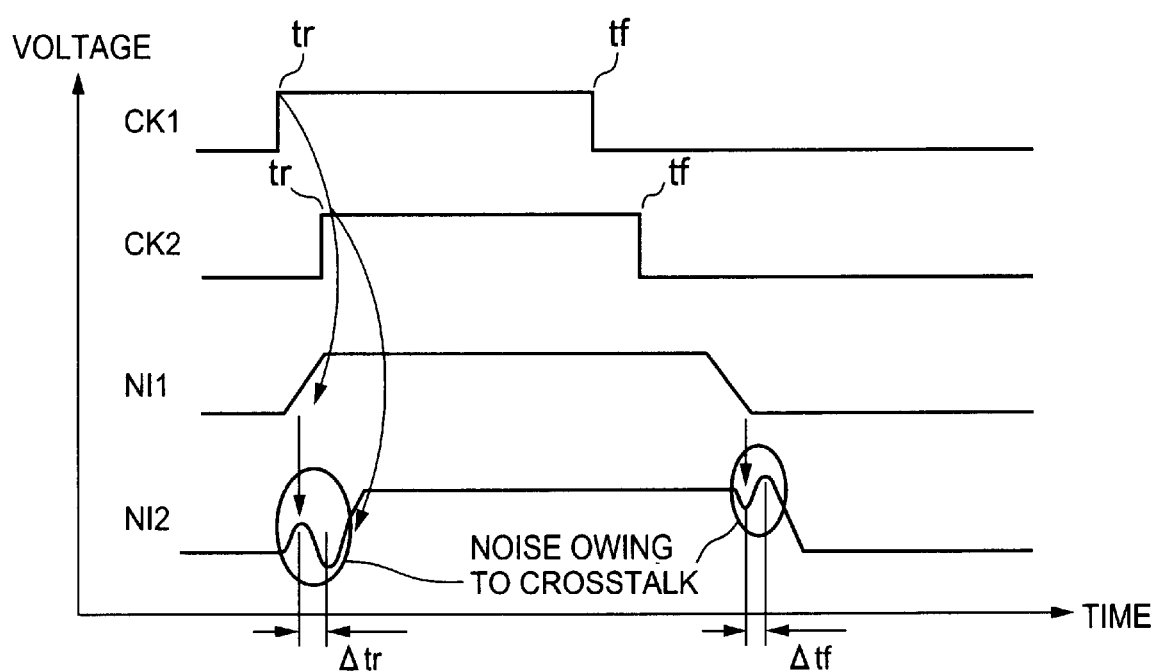
FIG. 20 is is a waveform diagram showing the clock signals output from the DLL circuit and the signals on the input wirings connected to the input terminals of the buffers in the semiconductor integrated circuit in FIG. 19.
Figure 21:
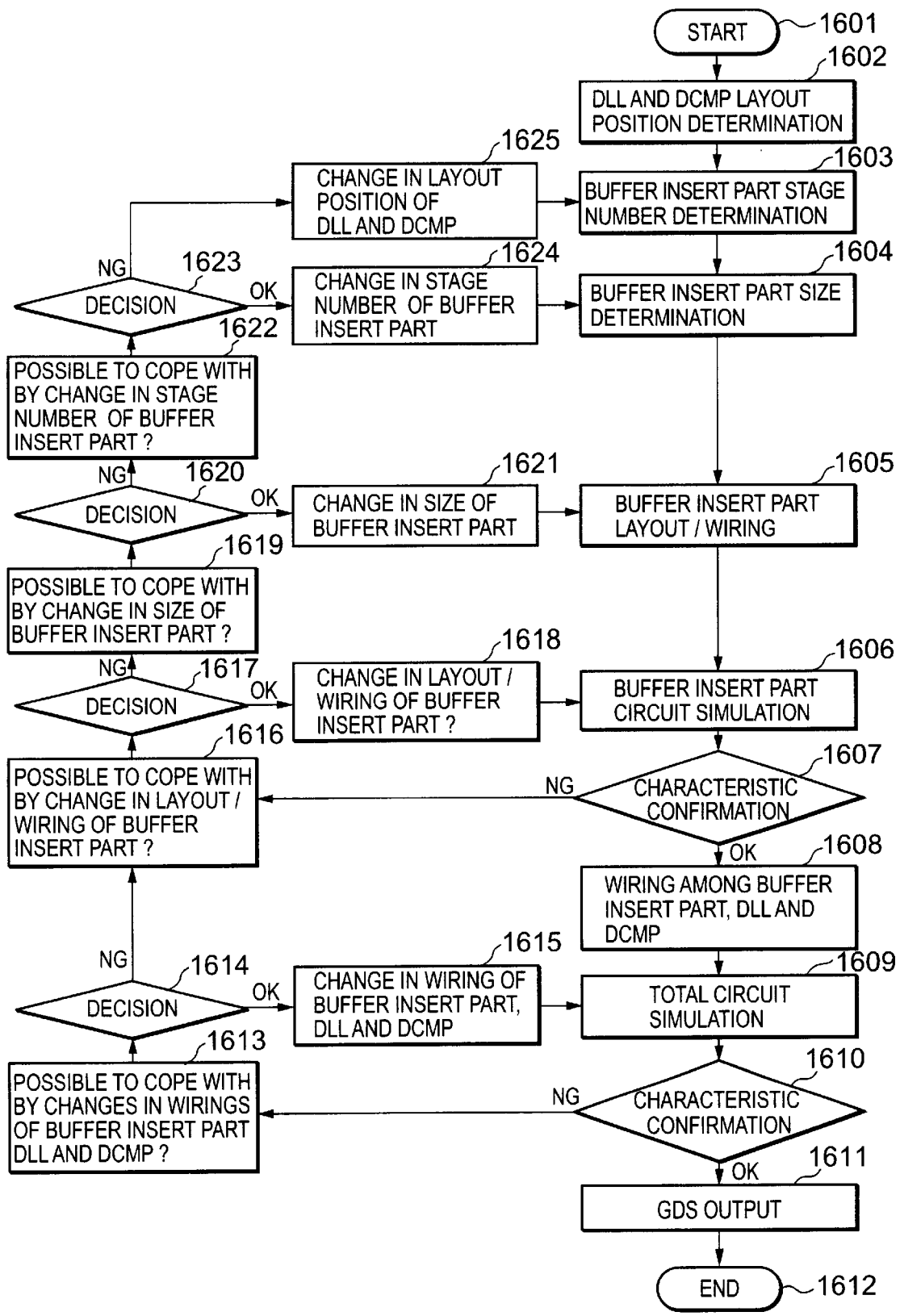
FIG. 21 is a flow chart showing the design method for determining the circuit layout and the wirings in the conventional semiconductor integrated circuit.

Moreover, there is a method of enhancing the drive capability by increasing the gate width of the PMOS, but it increases the layout area and is impractical. Furthermore, as shown in FIG. 20, the spot, where the tr edge of the clock signal CK2 arrives after a lapse of 1T following the change in the tr edge of the clock signal CK1, occurs where the effect of the crosstalk noise is in the positive direction with respect to the low level, namely, on the threshold voltage side of the CMOS inverter. Moreover, since the crosstalk noises are added in the same direction, skews and jitters are affected.

However, as in FIG. 5, the spot where the tr edge of the clock signal CK1 arrives after 1T following the tf change of the clock signal CK4 occurs in the negative direction in which the effect of the crosstalk noise is in the low level, namely, in the opposite direction to the threshold voltage of the CMOS inverter, so that it does not affect skews and jitters.

Figure 11:
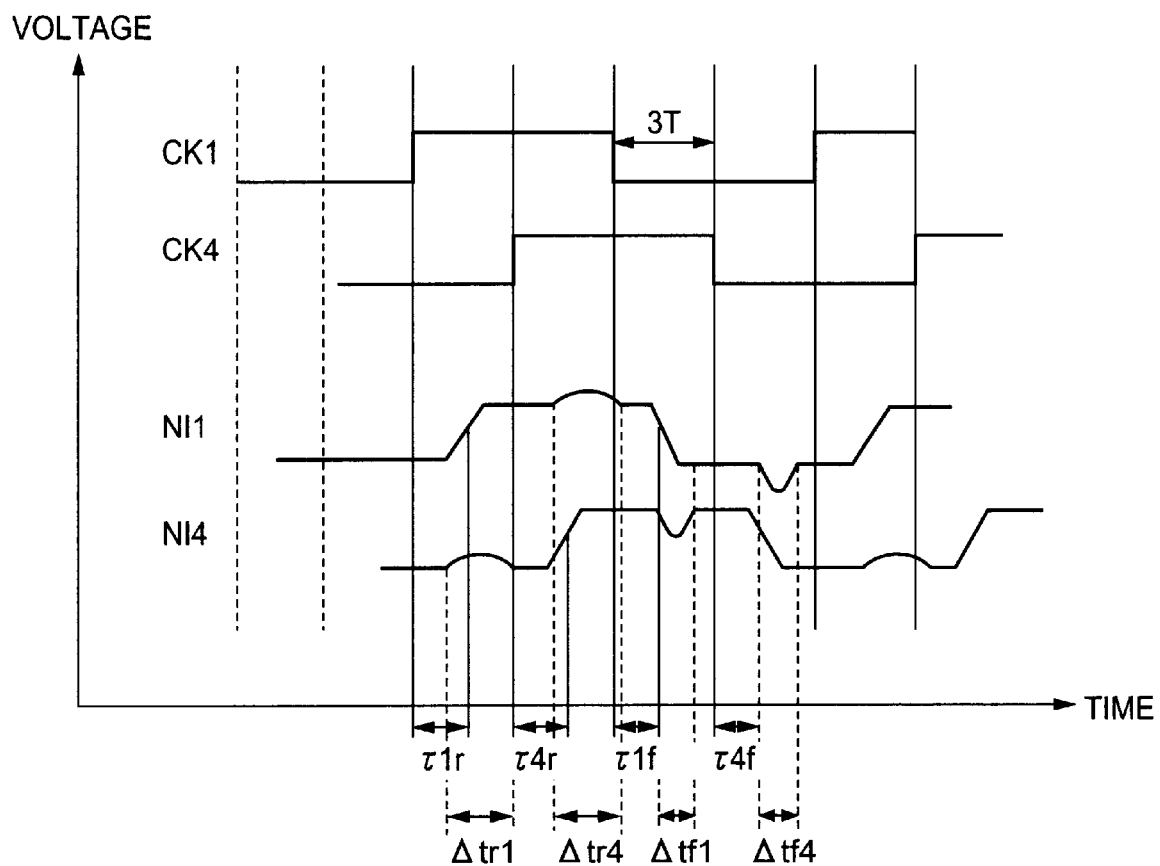
FIG. 11 is a waveform diagram showing the clock signals output from the DLL circuit and the signals on the input wirings connected to the input terminals of the buffers in the first example of the invention.

This phenomenon will be described in detail using FIG. 1 and FIG. 11. The tr edge of the clock signal CK1 of the DLL circuit 101 shown in FIG. 1 appears after a delay of 3T relative to the tf edge of the clock signal CK4 on the adjacent wiring. Describing the phenomenon with reference to FIG. 11, the tf edge of the clock signal CK4 is determined by the drive capability of the NMOS, and as a result of the parasitic capacitances CI1 and CI2 and a wiring resistance, not shown, arrives at the input terminal of the buffer B4 via the input wiring NI4 after a delay time of τ4f following departure from the DLL circuit 101.

Now, let us assume that the width Δtf4 of the crosstalk noise propagated to the clock signal CK1 via the parasitic capacitance CI1 is, for example 100 [ps]. Next, the tr edge of the clock signal CK1 adjacent to the clock signal CK4 changes after, for example, 200 [ps]. Here, the width Δtf4 of the crosstalk noise changes at a time apart by an interval of, for example, 100 [ps], where it will no longer affect the tr edge of the clock signal CK1.

After this, the tr edge of the clock signal CK1 arrives at the input terminal of the buffer B1 with a delay time τ1r through the input wiring NI1 of the buffer B1 owing to the parasitic capacitance CI1 and a wiring resistance not shown.

Figure 12:
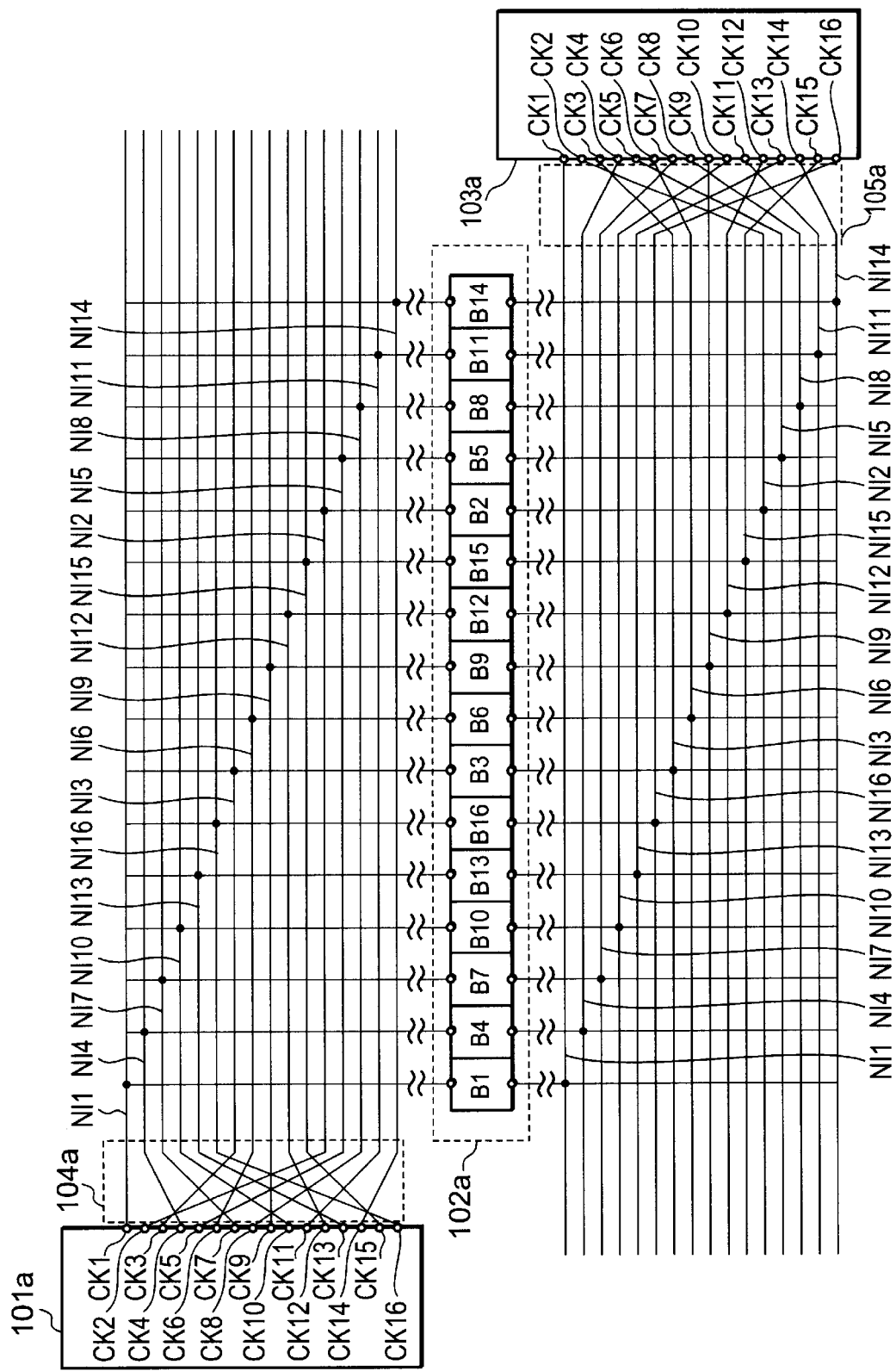
FIG. 12 is a circuit diagram showing the internal configuration of a semiconductor integrated circuit which serves as a first embodiment of the invention.

In this manner, when the number of the clock signals n is eight and the duty ratio of the clock signals CK1 to CK8 is 50%, by arranging the clock signals CK1 to CK8 such that the positions on the time base of the tf edges of the clock signals CK1 to CK8 shift sequentially by 3T or 5T, even if the tr edge and the tf edge of adjacent clock signals approach with each other to a distance smaller than 1T, the degree of the effect of the crossralk noise on other clock signals is less in the present invention than in the prior art shown in FIG. 20 to the extent that the drive capability is higher, because the tf edge makes change earlier Next, referring to the drawings, a first embodiment of the present invention will be described in detail. FIG. 12 is a circuit diagram showing the internal configuration of the semiconductor integrated circuit which serves as a first embodiment of the invention. FIG. 12 shows a circuit which supplies a plurality of clock signals CK1 to CK16 having identical delay difference output from a DLL circuit 101a to a DCMP circuit 103a via a buffer insert part 102a.

Figure 13:
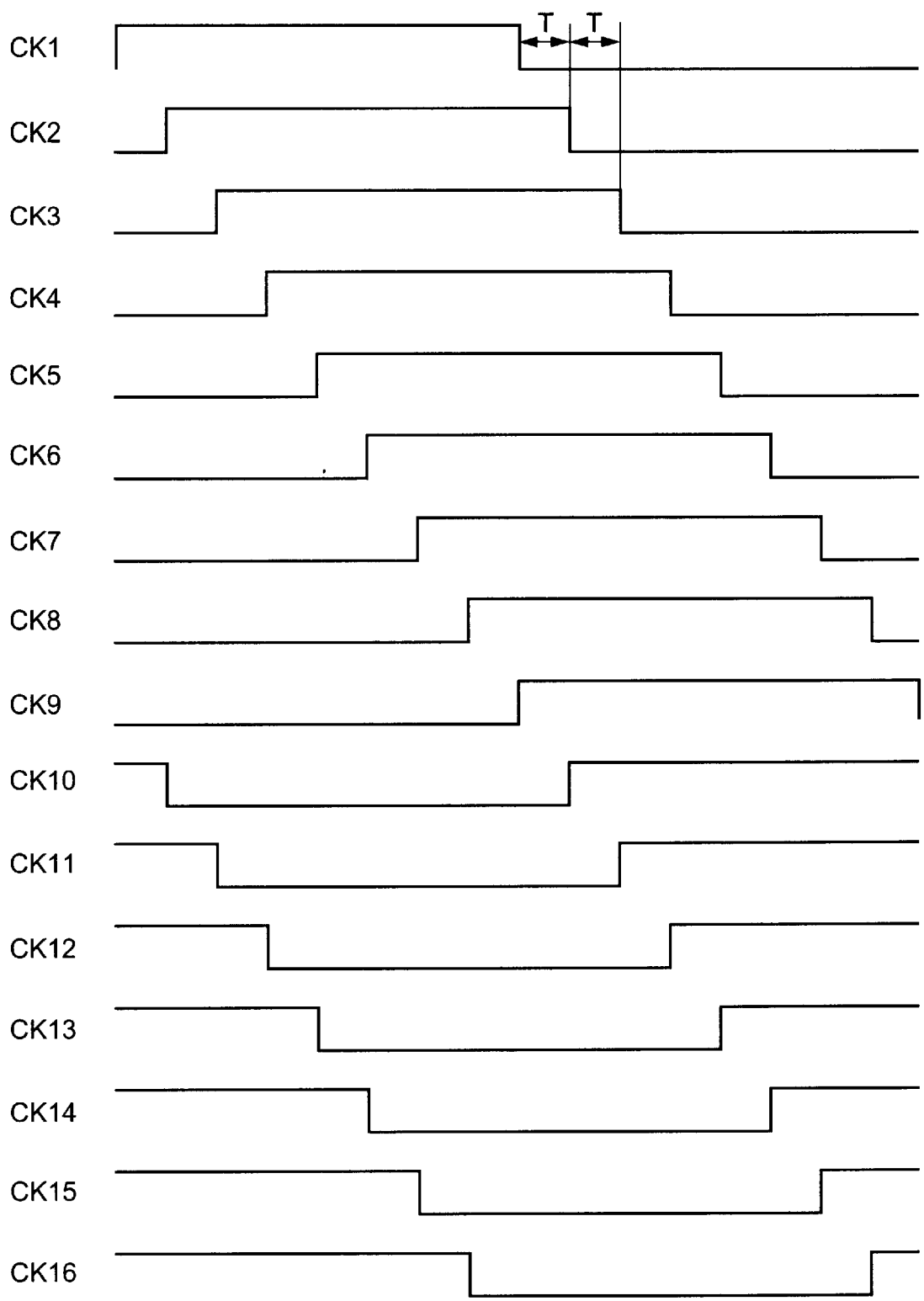
FIG. 13 is a waveform diagram showing the timings of the clock signals output from the DLL circuit in the first embodiment of the invention.

This embodiment corresponds to the case in which the high speed serial data rate is increased, accompanying the enlargement of the network market in recent years, such that the operating frequency of the DCMP circuit 103a is increased to twice as fast compared with that of the DCMP circuit 103 in FIG. 1, and the number n of clock signals to be generated in the DLL circuit 101a is increased to 16. The relationship among the clock signals CK1 to CK16 in the DLL circuit 101a is shown in FIG. 13.

The order of input wirings NI1 to NI16 which transmit clock signals CK1 to CK16 from the DLL circuit 101a to the buffer insert part 102a is permuted by a first wiring permute part 104a, and the wirings are connected to the corresponding input terminals of the buffers B1 to B16.

The buffers B1 to B16 in the buffer insert part 102a are provided to prevent attenuation of the clock signals CK1 to CK16 by the parasitic capacitances and the parasitic resistances of the wirings that connect the DLL circuit 101a and the DCMP circuit 103a. The order of output wirings NO1 to NO16 which transmit the clock signals CK1 to CK16 from the output terminals of the buffers B1 to B16 to the DCMP circuit 103a is permuted in a second wiring permute part 105a, and the wirings are connected to the corresponding input terminals of the DCMP circuit 103a.

Figure 14:
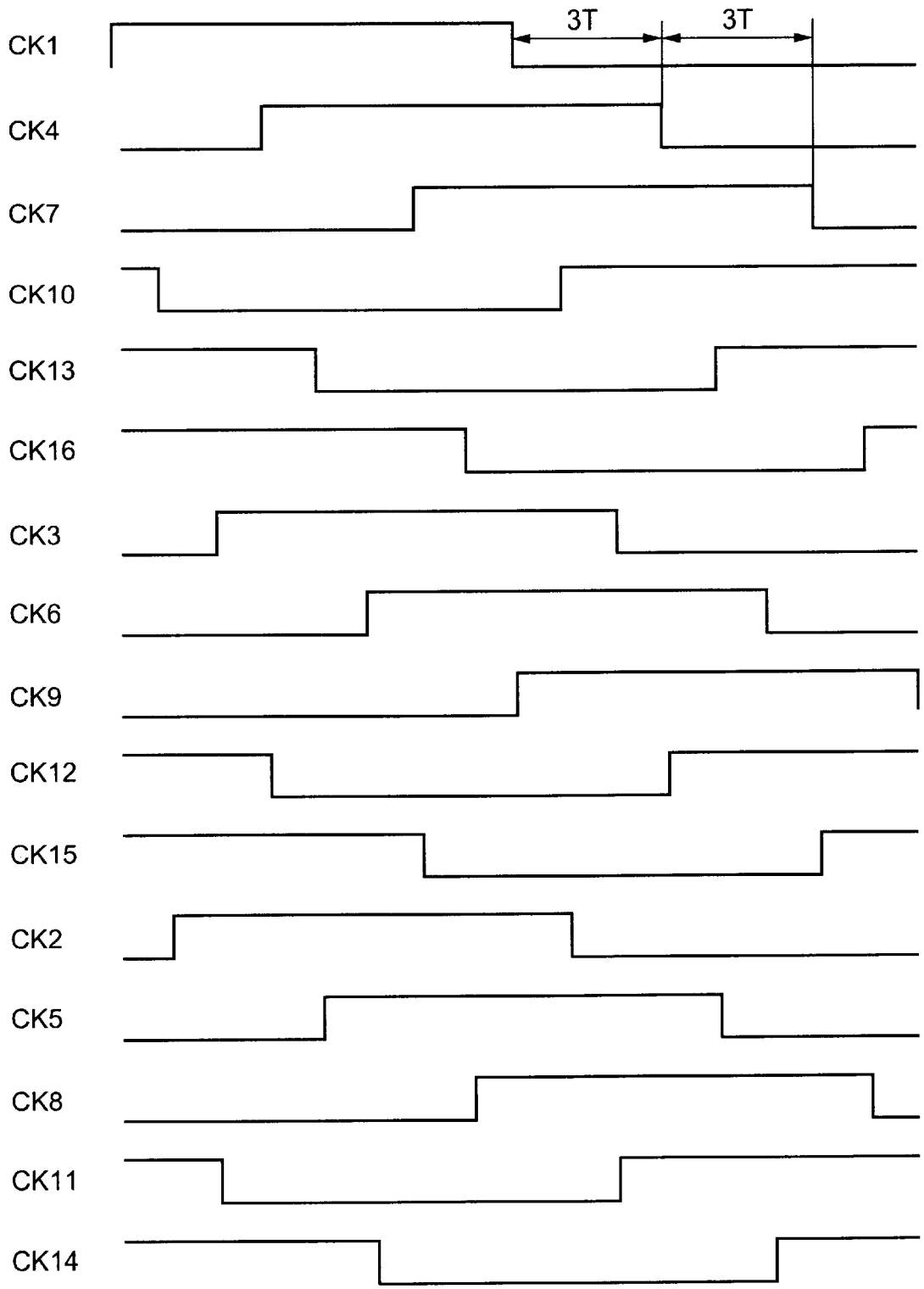
FIG. 14 is a waveform diagram showing the timings of the clock signals from the output of the first input wiring permute part to the input to the second wiring permute part in the first embodiment of the invention.

The relationship of the clock signals CK1 to CK16 from the outputs of the first wiring permute part 104a to the inputs of the second wiring permute part 105a is shown in FIG. 14. By setting the number n of the clock signals at 16, and a clock signal CKi (i is an integer of 1 to n) is delayed from a reference signal RCLK by a delay time i×T (T is a constant time), clock signals CK1 to CK16 in this embodiment are arranged in such a way that the positions of the fall edges tf on the time base are shifted sequentially by 3T as shown in FIG. 14.

Since the edge positions of adjacent clock signals are separated to have a sufficient time difference in this embodiment, the effect of crosstalk noises generated by the interference between the clock signals CK1 to CK16 can be eliminated, and the skews between the clock signals CK1 to CK16 and the jitters of respective clock signals CK1 to CK16 can be reduced.

Figure 15:
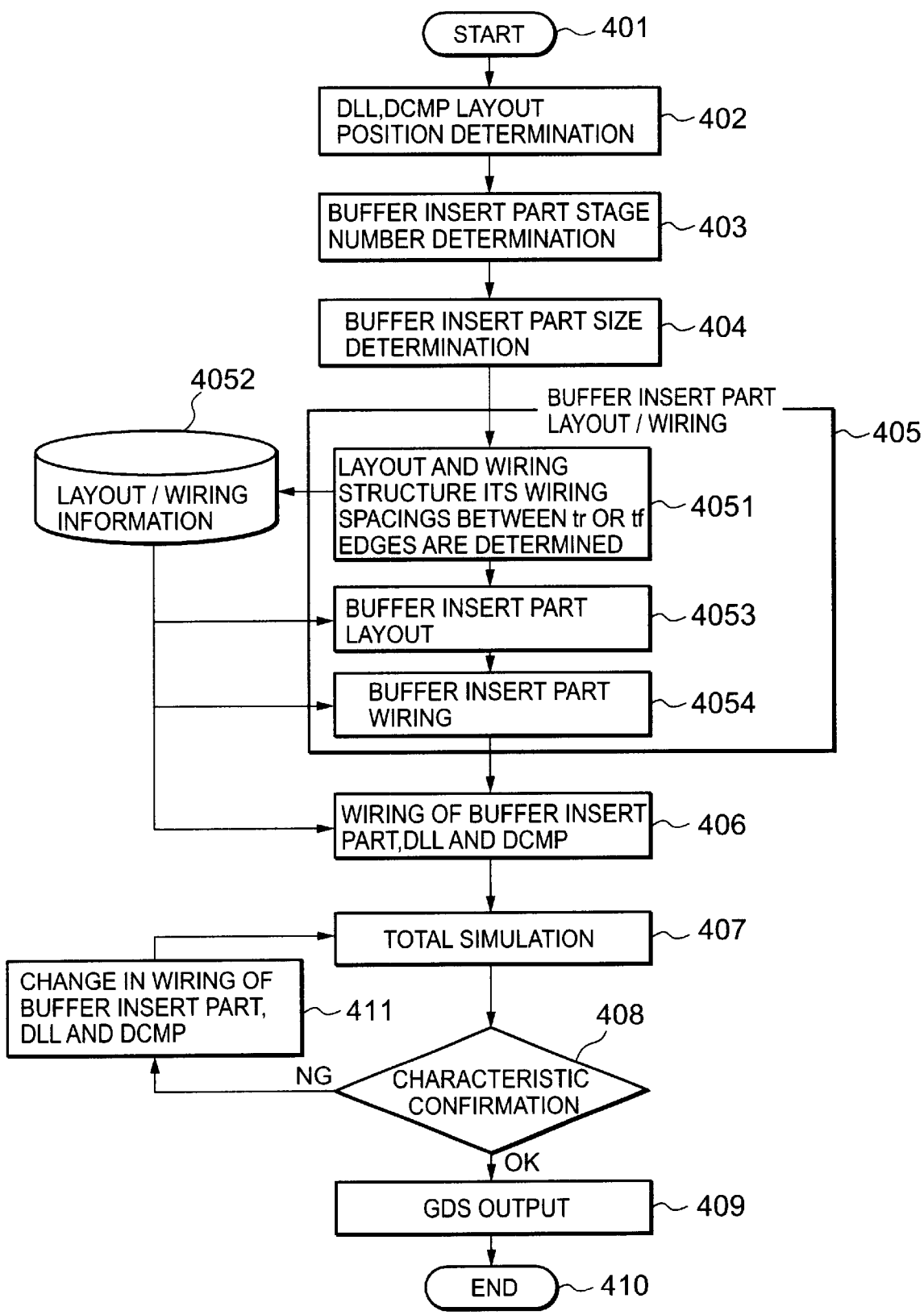
FIG. 15 is a flow chart showing a design method which determines the circuit layout and wirings in the first embodiment of the invention.

Next, a design method for determining the circuit layout and the wirings of the semiconductor integrated circuit of this embodiment will be described in detail by making correspondence with the circuit diagram in FIG. 1. FIG. 15 is a diagram showing a series of flow as in the following. Namely, it starts with a step 402 of deciding the arrangement positions of the DLL circuit 101a and the DCMP circuit 103a, and continues to carry out arrangement and wiring of the buffer insert part 102a, after connection of the DLL circuit 101a, the buffer insert part 102a and the DCMP circuit 103a, confirms the skews between the clock signals CK1 to Ck16 output from the DLL circuit 101a and the jitters of the clock signals CK1 to CK16, confirms the skews between the clock signals CK1 to CK16 input to the buffers B1 to B16 of the buffer insert part 102a and the jitters of the clock signals CK1 to CK16, further confirms the skews between the clock signals CK1 to CK16 input to the DCMP circuit 103a and the jitters of respective clock signals CK1 to CK16, to carry out characteristic confirmation step 408 which confirms whether the respective skews and jitters satisfy specifications or not.

First, the designer in charge decides the layout positions of the DLL circuit 101a and the DCMP circuit 103a from the size of the DLL circuit 101a and the DCMP circuit 103a and the order of the signal lines (step 402 of FIG. 15). Next, the designer roughly calculates the parasitic capacitance per unit area based on the layout positions of the DLL circuit 101a and the DCMP circuit 103a decided in step 402, and finds the drive capability per stage of the buffer insert part 102a to decide the required number of stages of respective buffers B1 to B16 of the buffer insert part 102a (step 403). Following that the designer decides the size of the buffer insert part from the required stage number derived in step 403 (step 404). Next, the designer carries out layouy and wiring of the buffer insert part 102a based on the size of the buffer insert part 102a decided in step 404 (step 405).

As the processing for step 405, the designer determines the layout structure and the wiring structure of the buffer insert part 102a so as to give a sufficient time difference for the edge positions of adjacent clock signals (step 4051). As described in the above, the clock signals CK1 to CK16 are arranged such that the positions of the fall edges tf on the time base are shifted sequentially by 3T in this embodiment, as shown in FIG. 14.

In other words, as shown in FIG. 12, during the period of the output from the first wiring permute part 104a to the input to the second wiring permute part 105a, the buffers B1 to B16 are arranged one-dimensionally so as to have the clock signals CK1 to CK16 to be arranged in the order of CK1, CK4, CK7, C10, CK13, CK16, CK3, CK6, CK9, CK12, CK15, CK2, CK5, CK8, CK11 and CK14, in this embodiment.

In response to this layout structure, the order of the input wirings NI1 to NI16 are permuted by the first wiring permute part 104a so as to be arrange in the order NI1 (NO1), NI4 (NO4), NI7 (NO7), NI10 (NO10), NI13 (NO13), NI16 (NO16), NI3 (NO3), NI6 (NO6), NI9 (NO9), NI12 (NO12), NI15 (NO15), NI2 (NO2), NI5 (NO5), NI8 (NO8), NI11 (NO11) and NI14 (NO14).

Next, the designer prepares layout and wiring information which shows the layout and wiring structures determined in step 4051 (4052). Then, the designer lays out the buffers B1 to B16 in the buffer insert part 102a according to the layout and wiring information prepared in step 4052 (step 4053), and carries out wirings of the respective buffers B1 to B16 in the buffer insert part 102a according to the layout and wiring information (step 4054).

Following that, the designer carries out wirings between the DLL circuit 101a and the buffer insert part 102a, and between the buffer insert part 102a and the DCMP circuit 103a (step 406). After completion of the wirings, the designer carries out simulation of the total circuit consisting of the DLL circuit 101a, the buffer insert part 102a and the DCMP circuit 103a based on the circuit data in which the parasitic capacitances and the parasitic resistances are extracted from the result of wirings of the DLL circuit and the buffer insert part 102a and the DCMP circuit 103a (step 407).

The designer then carries out characteristic confirmation to see whether the skews between the clock signals CK1 to Ck16 and the jitters of respective signals CK1 to CK16 satisfy the standards or not as a circuit as a whole from the result of the circuit simulation in step 407 (step 408). When the result of the circuit simulation satisfy the standards, the designer prepares artwork data (referred to as GDS data hereinafter) (step 409), and completes the design.

When the skews between the clock signals CK1 to CK16 and the jitters of the clock signals CK1 to Ck16 do not satisfy the standards, the designer changes the wirings between the DLL circuit 101a and the buffer insert part 102a, and the buffer insert part 102a and the DCMP circuit 103a (steep 411), and returns to step 407.

As in the above, according to this embodiment, since it is possible to change the design so as to reduce the skews between the clock signals CK1 to CK16 and the jitters of respective clock signals CK1 to CK16, even when the skews between the clock signals CK1 to CK16 and respective jitters of the clock signals CK1 to CK16 do not satisfy the standards, what is needed for design change is simply the wiring structures between the DLL circuit 101a and the buffer insert part 102a and between the buffer insert part 102a and the DCMP circuit 103a, and it becomes possible to satisfy the standards by fine adjustments of the wiring structures. Accordingly, the number of return processes can be reduced from the conventional value, and the design time can be reduced.

Figure 16:
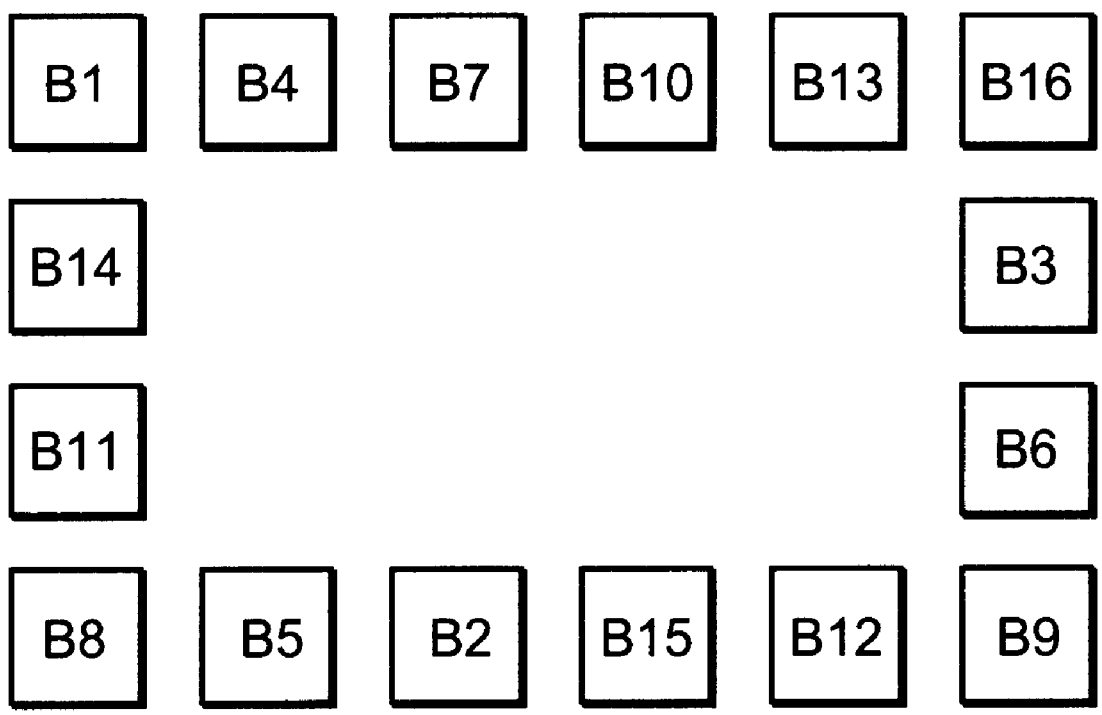
FIG. 16 is a plan view showing the layout structure of of the buffer insert part in a second embodiment of the invention.

Referring to the drawings, a second embodiment of the invention will be described in detail next. FIG. 16 is a plan view showing the layout structure of the buffer insert part 102a in this embodiment which is another example of the layout structure of the buffer insert part 102a determined in step 4051 of the first embodiment. As shown in FIG. 12, in the first embodiment, the buffers B1 to B16 in the buffer insert part 102a were arranged one-dimensionally.

In contrast, in this embodiment, the buffers B1 to B16 are arranged clockwise in the order of buffers B1, B4, B7, B10, B13, B16, B3, B6, B9, B12, B15, B2, B5, B8, B11 and B14.

Figure 17:
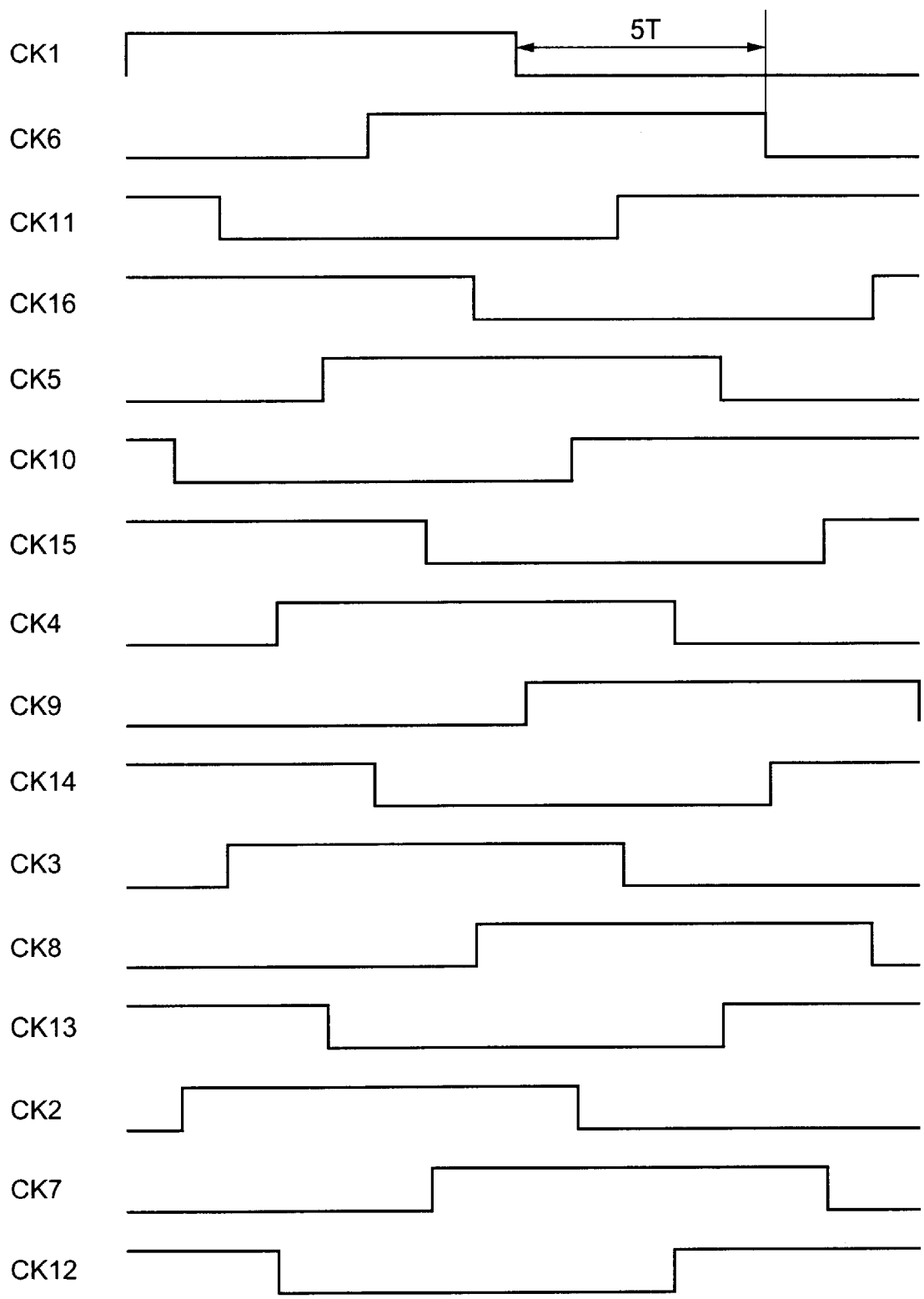
FIG. 17 is a waveform diagram showing another example of the timings of the clock signals from the output of the first wiring permute part to the input of the second wiring permute part.

In the first and second embodiments, the clock signals CK1 to CK16 are arranged so as to have the positions of their fall edges tf on the time base shifted sequentially by 3T, but the clock signals may be arranged to have the positions shifted sequentially by 5T.
When arranged so as to have their tf edges shifted sequentially by 5T, the clock signals are arranged in the order of CK1, CK6, CK11, CK16, CK5, CK10, CK15, CK4, CK9, CK14, CK3, CK8, CK13, CK2, CK7 and CK12 in the period from the output from the first wiring permute part 104a to the input to the second permute part !05a. The relationship among the clock signals CK1 to CK16 is shown in FIG. 17.

Furthermore, the clock signals CK1 to CK16 may be arranged such that the positions on the time base of their fall edges tf are shifted sequentially by 11T. When the clock signals are arranged to have the tf edges shifted sequentially by 11T, the clock signals are arranged in the order of CK1, CK12, CK7, CK2, CK13, CK8, CK3, CK14, CK9, CK4, CK15, CK10, CK5, CK16, CK11 and CK6, during the period from the output from the first wiring permute part 104a to the input to the second wiring permute part 105a.

Furthermore, the clock signals CK1 to CK16 may be arranged so as to have the positions on the time base of their fall edges tf shifted sequentially by 13T. When the clock signals are arranged such that their fall edges tf are shifted sequentially by 13T, the clock signals CK1 to CK16 are arranged in the order of CK1, CK14, C11, CK8, CK5, CK2, CK15, CK12, CK9, CK6, CK3, CK16, CK13, CK10, CK7 and CK4 during the period from the output from the first permute part 104a to the input to the second permute part 105a.

Figure 18:
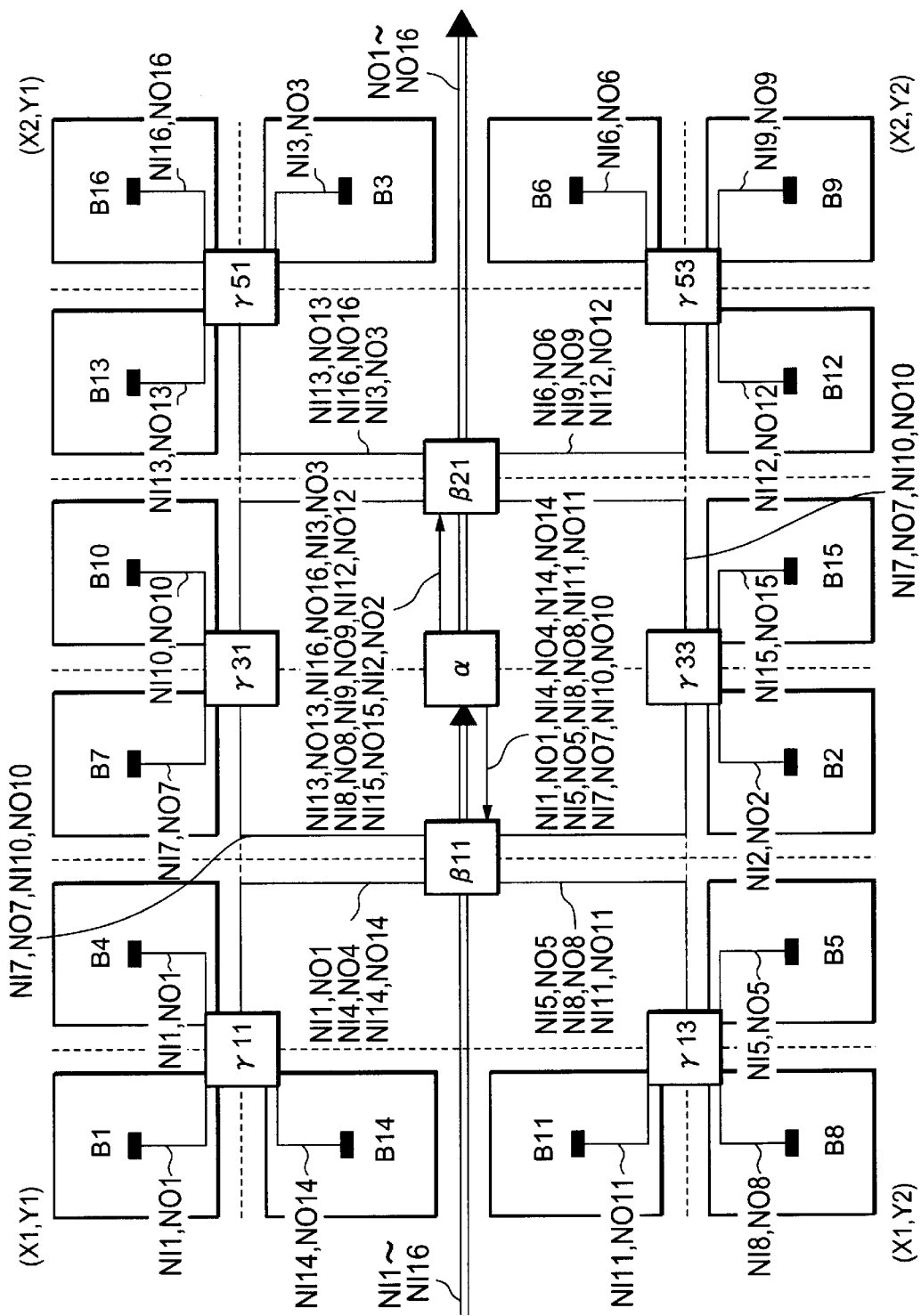
FIG. 18 is a plan view showing the wiring structure of the buffer insert part in a third embodiment of the invention.

Finally, referring to the drawings, a third embodiment of the invention will be described in detail. FIG. 18 is a plan view showing the the layout structure of the buffer insert part 102a in this embodiment. This embodiment shows another example of the wiring structure of the buffer insert part 102 determined in step 4051 of the first embodiment. In this embodiment, the DLL circuit 101a, the first wiring permute part 104a, the input wirings NI1 to NI16, the output wirings NO1 to NO16, the second wiring permute part and the DCMP circuit 103a are exactly the same as in the first embodiment.

In this embodiment, the buffers B1 to B16 are arranged as shown in FIG. 18 such that the positions of the fall edges tf on the time base of the clock signals CK1 to CK16 are shifted sequentially by 3T. Then, the input wirings NI1 to NI16 to the buffers B1 to B16 are bundled at a point in the central part of the region where the buffers B1 to B16 are arranged.

Next, the input wirings NI1 to NI16 are distributed to two points β11 and β21 such that the wiring lengths to respective wirings from the point α are equal. Here, the input wirings NI1, NI4, NI5, NI7, NI8, NI10, NI11 and NI14 to the buffers B1, B4, B5, B7, B8, B10, B11 and B14 are laid from the point α to the point β11, and the input wirings NI2, NI3, NI6, NI9, NI12, NI13,NI15 and NI16 to the buffers B2, B3, B6, B9, B12, B13, B15 and B16 are laid fro the point α to the point β21.

Following that, the input wirings NI1, NI4, NI5, NI7, NI8 NI10, NI11 and NI14 that have been laid to the point β11 are distributed to three points γ11, γ31 and γ13, and the input wirings NI2, NI3, NI6, NI9, NI12, NI13,NI15 and NI16 that have been laid to the point β21 are distributed to three points γ51, γ33 and γ53.

Namely, the input wirings NI1, NI4 and NI14 are laid to the point γ11, the input wirings NI7 and NI10 are laid to the point γ31 and the input wirings NI5, NI8, and NI11 are laid to the point γ13. In addition, the input wirings NI3, NI13 and NI16 are laid to the point γ51, the input wirings NI2 and NI15 are laid to the point γ33 and the input wirings NI6, NI9 and NI12 are laid to the point γ53.

Next, the input wirings NI1 to NI16 that have been laid to the points γ22, γ31, γ13, γ51, γ33 and γ53 are distributed to 3 or 2 part so as to have the wiring lengths from the points γ11, γ31, γ13, γ51, γ33 and γ53 are equal, and these input wirings are laid to respective input terminals of the buffers B1 to B16 at the connection destinations.

More specifically, the input wirings NI1, NI4 and NI14 laid up to the point γ11 are extended to the buffers B1, B4 and B14, respectively, the input wirings NI7 and NI10 laid to the point γ31 are extended to the buffers B7 and B10, respectively, the input wirings Ni5, NI8 and NI11 laid to the point γ13 are extended to the buffers B5, B8 and B11, respectively, the input wirings NI3, NI13 and NI16 laid to the point γ51 are extended to the buffers B3, B13 and B16, respectively, the input wirings NI2 and NI15 laid to the point γ33 are extended to the buffers B2 and B15, respectively, and the input wirings 6, NI9 and NI12 laid to the point γ53 are extended to the buffers B6, B9 and B12.

On the other hand, for the output wirings NO1 to NO16 it only need to lay wires in the reverse routes to those of the input wirings NI1 to NI16. First, the output wirings NO1 to NO16 are laid to the points γ11, γ31, γ13, γ51, γ33 and γ53 so as to have equal wiring lengths from the buffers B1 to B16.

More specifically, the output wirings NO12, NO4 and NO14 are laid from the output terminals of the buffers B1, B4 and B14, respectively to the point γ11, the output witrings NO7 and NO10 are laid from the output terminals of the buffers B7 and B10, respectively to the point γ31, the output wirings NO5, NO8 and NO11 are laid from the output terminals of the buffers B5, B8 and B11, respectively, to the point γ13, the output wirings NO3, NO13 and NO16 are laid to the output terminals of the buffers B3, B13 and B16, respectively, to the point γ51, the output wirings NO2 and NO15 are laid fron the output terminals of the buffers B2 and B15, respectively, to the point γ33, and the output wirings NO6, NO9 and NO12 are laid to the output terminals of the buffers B6, B9 and B12, respectively, to the point γ53.

Next, the output wirings NO1 to NO16 that have been laid to the points γ11, γ31, γ13, γ51, γ33 and γ53 are laid to the points β11 and β21 so as to have equal wiring lengths from the points γ11, γ31, γ13, γ51, γ33 and γ53, and the output wirings NO1 to NO16 that have been laid to the point β11 and β21 are extended to the point α so as to have the equal wiring lengths from the points β11 and β21. Then, the output wirings NO1 to NO16 are laid from the point α to the second wiring permute part 105*a*.

When the number n of the clock signals is 16, the coordinates Xα and Yα of the point α are derived from the following expressions.

$$Xa=(X2\square X1)/2+X1,$$

$$Ya=(Y2\square Y1)/2+Y1 \quad (3)$$

In Eq. (3), X2 and X1 are the maximum and minimum values, respectively, in the X direction of the region where the buffers B1 to B16 are arranged, and Y2 and Y1 are the maximum and minimum values, respectively, in the Y direction of the region where the buffers B1 to B16 are arranged.

Moreover, the coordinates Xj1 and Yj1 of the points βj1 (j is a natural number, and here j=1 and 2)are derived from the following expressions.

$$Xj1=2\times j\times (X2\square X1)/6+X1,$$

$$Yj1=(Y2\square Y1)/2+Y1 \quad (4)$$

Furthermore, the coordinates Xkl and Ykl of the points γkl (k and l are natural numbers, and here k=1, 3 and 5 and l=1 and 3) are derived from the following expressions.

$$Xkl=k\times (X2\square X1)/6+X1,$$

$$Ykl=l\times (Y2\square Y1)/6+Y1 \quad (5)$$

In the above, the wiring structure as described in connection with FIG. 10 may also be used. Namely, the buffers B1 to B16 are arranged in the order as shown in FIG. 16, and the input wirings NI1 to NI16 are laid to the right end of the region where the buffers B1 to B16 are arranged in order to make the lengths of the input wirings equal. In this case, the input wirings are arranged in the order of NI1, NI4, NI7, Ni10, NI13, NI16, NI3, NI6, NI9, NI12, NI15, NI2, NI5, NI8, NI11 and NI14.

Next, the input wirings NI1 to NI16 in the Y direction to be connected to the input wirings NI1 to NI16 in the X direction, the input wirings ni1 to NI16 are laid to the input terminals of respective buffers B1 to B16 so as to make the lengths equal.

On the other hand, the output wirings need be laid in the reverse direction to that of the input wirings NI1 to NI16. That is, when the output wirings NO1 to NO16 are to be taken out from respective output terminals of the buffers B1 to B16, the output wirings NO1 to NO16 are arranged to have equal lengths in the Y direction.

Next, the output wirings in the X direction to be connected to the output wirings In the Y direction are arranged with the left end of the region where the buffers B1 to B16 are arranged as the starting point in order to have equal lengths for them. In this case, the order of arrangement of the output wirings is NO, NO4, NO7, NO10, NO13, NO16, NO3, NO6, NO9, NO12, NO125, NO2, NO5, NO8, NO11 and NO14, According to the present invention, for n clock signals CKi each delayed by a delay time of i×T from the reference signal, by setting the edge positions of two adjacent clock signals transmitted on two signal lines to be apart, as seen on the time base, in time more than T, it is possible to eliminate the effect of crosstalk noise generated by the interference between the clock signals. As a result, it is possible to minimize the spacing between the wirings and reduce the skews between the clock signals and the jitters of respective clock signals without increasing the area of the semiconductor integrated circuit.

Moreover, by arranging n buffers in such a way that the edge positions of two clock signals transmitted on two input or output wirings as seen on the time base are separated longer than T in time, the skews between the clock signals and the jitters of respective clock signals can be reduced.

Furthermore. When determining the wiring structure of n input wirings transmitting n clock signals to n buffers from a first circuit and n output wirings transmitting n clock signals to a second circuit from the n buffers, and the layout structure of the n buffers, by determining the wiring structure and the layout structure in such a manner that the edge positions, as seen on the time base, of two clock signals transmitted on two adjacently situated input or output wirings, are separated in time longer than T, it is possible, even if the skews between the clock signals and the jitters of the clock signals fail to satisfy the standards, what is required for change in design is only the wiring structures between the first circuit and the buffer insert part and between the buffer insert part and the second circuit, so that the number of return steps can be reduced and the design time can be reduced.

Although the invention has been described with reference to specific embodiments, this description is not meant to be construed in a limiting sense. Various modifications of the disclosed embodiments will become apparent to persons skilled in the art upon reference to the description of the invention. It is therefore contemplated that the appended claims will cover any modifications or embodiments as fall within the true scope of the invention.

What is claimed is:

1. A semiconductor integrated circuit comprising:
    a first circuit which outputs n (n is an integer of 2 or more) clock signals CKi (i is an integer of 1 to n), each delayed by a delay time of i×T (T is a constant time) from a reference signal, and
    a second circuit which carries out signal processing using said n clock signals from the first circuit via n signal wirings, wherein, for at least a part of a length of said n signal wirings, the positions of edges of two of said clock signals transmitted on adjacent two of said signal wirings, as seen on a time baseline are separated in time greater than time T.

2. The semiconductor integrated circuit as claimed in claim 1, further comprising:

a buffer insert circuit provided between said first circuit and said second circuit, said buffer insert circuit being equipped with n buffers, corresponding to said n clock signals, where said signal wirings comprise n input wirings which transmit said n clock signals from said first circuit to said n buffers and n output wirings which transmit said n clock signals from said n buffers to said second circuit, and said n buffers are arranged so that positions of edges of two of said clock signals transmitted on two of adjacent input wirings or output wirings are separated by a time greater than time T, as seen on a time baseline.

3. The semiconductor integrated circuit as claimed in claim 2, wherein said n buffers are arranged one-dimensionally.

4. The semiconductor integrated circuit as claimed in claim 2, wherein said n buffers are arranged two-dimensionally in one of a clockwise orientation and a counterclockwise orientation.

5. The semiconductor integrated circuit as claimed in claim 4, wherein:

said n input wirings are laid to a central part of a region where said n buffers are arranged, and are laid from the central part to input terminals of corresponding buffers so as to have mutually equal wiring lengths, and said n output wirings are laid from output terminals of respective buffers to the central part so as to have equal wiring lengths, and are laid from the central part to said second circuit.

6. The semiconductor integrated circuit as claimed in claim 4, wherein:

said n input wirings are laid so as to have equal wiring lengths in an X direction from said first circuit, and are laid further to input terminals of corresponding buffers so as to have mutually equal wiring lengths in a Y direction, and said n output wirings are laid from output terminals of corresponding buffers so as to have mutually equal wiring lengths in the Y direction and are laid further to said second circuit so as to have equal wiring lengths in the X direction.

7. A method of reducing at least one of skew and jitter in a clock circuit comprising a circuit which outputs n (n is an integer of 2 or more) clock signals $CK_i$ (i is an integer of 1 to n), each delayed by a delay time of $i \times T$ (T is a constant time), from a reference signal, said method comprising:

interconnecting said n output clock signals $CK_i$ to a corresponding n sections of wiring such that a timing of clock signals on any two adjacent wiring sections is greater than T.

8. The method of claim 7, wherein:

said circuit which outputs n clock signals comprises a first circuit; and said n sections of wiring interconnect said n clock signals from said first circuit to a second circuit by n buffers, said method further comprising:

arranging said n buffers in a layout such that a timing of signals received by any two adjacent buffers differs by an amount greater than T.

9. The method of claim 8, further comprising:

placing said n buffers in a one-dimensional pattern.

10. The method of claim 8, further comprising:

placing said n buffers in a two-dimensional pattern.

11. The method of claim 10, wherein said two dimensional pattern comprises one of a clockwise orientation and a counterclockwise orientation and said two-dimensional pattern has a center region.

12. The method of claim 10, further comprising:

laying said wiring sections from said first circuit to said center region to make a connection to input terminals of said buffers.

13. The method of claim 10, further comprising:

laying said wiring sections interconnecting output terminals of said buffers to said second circuit such that a connection to each said output terminal is made from said center region.

14. An integrated circuit, comprising:

a first circuit for receiving a reference clock signal and which outputs n (n is an integer of 2 or more) clock signals $CK_i$ (i is an integer of 1 to n), each delayed by a delay time of $i \times T$ (T is a constant time) from said reference clock signal; and n signal wirings for transmitting said n clock signals from said first circuit to a second circuit, said n signal wirings being substantially parallel to each other, said n signal wirings being interconnected to said first circuit such that a timing on any two adjacent signal wirings differs by an amount greater than T.

15. The integrated circuit of claim 14, further comprising:

n buffers, each having an input terminal connected to one of said n signal wirings.

16. The integrated circuit of claim 15, wherein said n buffers are arranged such that a timing of signals at each of two adjacent buffers differs by an amount greater than T.

17. The integrated circuit of claim 15, further comprising:

n output signal wirings, each connected respectively to an output terminal of one of said n buffers, said n output signal wirings being substantially parallel to each other, wherein a timing of signals on any two adjacent parallel output signal wirings differs by an amount greater than T.

18. The integrated circuit of claim 14, further comprising:

at least one second circuit receiving said n clock signals from said first circuit.

19. The integrated circuit of claim 17, further comprising:

at least one second circuit connected to said n output signal wirings from said n buffers.

20. The integrated circuit of claim 16, wherein said n buffers are laid out in a two-dimensional pattern.

* * * * *